US012621687B2

(12) United States Patent
Sharma et al.

(10) Patent No.: US 12,621,687 B2
(45) Date of Patent: May 5, 2026

(54) VENDOR ONBOARDING AND PRE-DEPLOYMENT SERVICE TESTING

(71) Applicant: Boost SubscribeCo L.L.C., Englewood, CO (US)

(72) Inventors: Nikhil Sharma, Highlands Ranch, CO (US); Ramanathan Sekkappan, Prosper, TX (US)

(73) Assignee: Boost SubscriberCo L.L.C., Englewood, CO (US)

( * ) Notice: Subject to any disclaimer, the term of this patent is extended or adjusted under 35 U.S.C. 154(b) by 242 days.

(21) Appl. No.: 18/468,609

(22) Filed: Sep. 15, 2023

(65) Prior Publication Data
US 2025/0097741 A1 Mar. 20, 2025

(51) Int. Cl.
*H04W 24/06* (2009.01)
*G06F 21/60* (2013.01)

(52) U.S. Cl.
CPC .......... *H04W 24/06* (2013.01); *G06F 21/602* (2013.01)

(58) Field of Classification Search
CPC .............................. H04W 24/06; G06F 21/602
See application file for complete search history.

(56) References Cited

U.S. PATENT DOCUMENTS

| | | | | |
|---|---|---|---|---|
| 11,748,686 | B1* | 9/2023 | Kwan | G06F 11/3684 |
| | | | | 705/7.27 |
| 2013/0078965 | A1* | 3/2013 | Agrawal | H04W 4/00 |
| | | | | 455/414.1 |
| 2020/0057633 | A1* | 2/2020 | Topiwala | G06F 8/433 |
| 2022/0405092 | A1* | 12/2022 | Miedema | G06F 8/60 |
| 2024/0303169 | A1* | 9/2024 | Chavan | G06F 11/26 |
| 2024/0338309 | A1* | 10/2024 | Wilson | G06F 8/65 |
| 2025/0094300 | A1* | 3/2025 | Sharma | G06F 11/261 |

* cited by examiner

*Primary Examiner* — Abiy Getachew
(74) *Attorney, Agent, or Firm* — Kilpatrick Townsend & Stockton LLP

(57) ABSTRACT

Systems and methods for service vendor onboarding and pre-production artifact validation and functional testing are provided. An example method includes receiving, in an automated test control system in connection with a cellular network implemented on a cloud-computing platform, an artifact associated with a service provided by a service vendor, and the service is to be deployed on the cellular network. The method further includes storing the received artifact in an untrusted artifacts database, generating and configuring a first test environment on a first virtual private cloud of the cloud-computing platform, performing validation on the received artifact in the first test environment, in response to a determination that the artifact is validated, performing functional testing on the validated artifact in the first test environment, and in response to a determination that the artifact passes the functional testing, signing the artifact and storing the signed artifact in a repository.

20 Claims, 12 Drawing Sheets

600A

600B

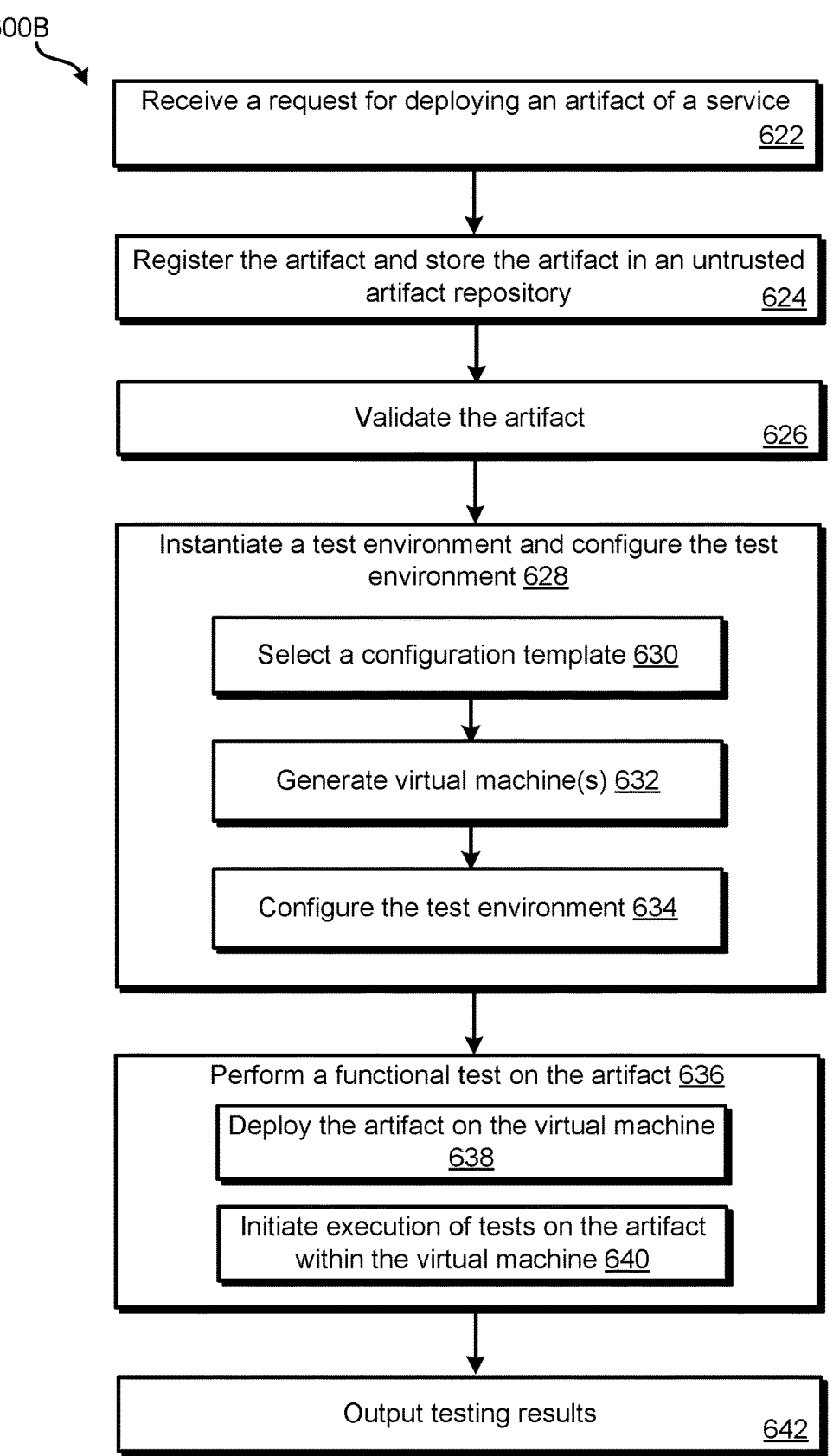

Receive a request for deploying an artifact of a service
622

Register the artifact and store the artifact in an untrusted artifact repository
624

Validate the artifact
626

Instantiate a test environment and configure the test environment 628

Select a configuration template 630

Generate virtual machine(s) 632

Configure the test environment 634

Perform a functional test on the artifact 636

Deploy the artifact on the virtual machine 638

Initiate execution of tests on the artifact within the virtual machine 640

Output testing results
642

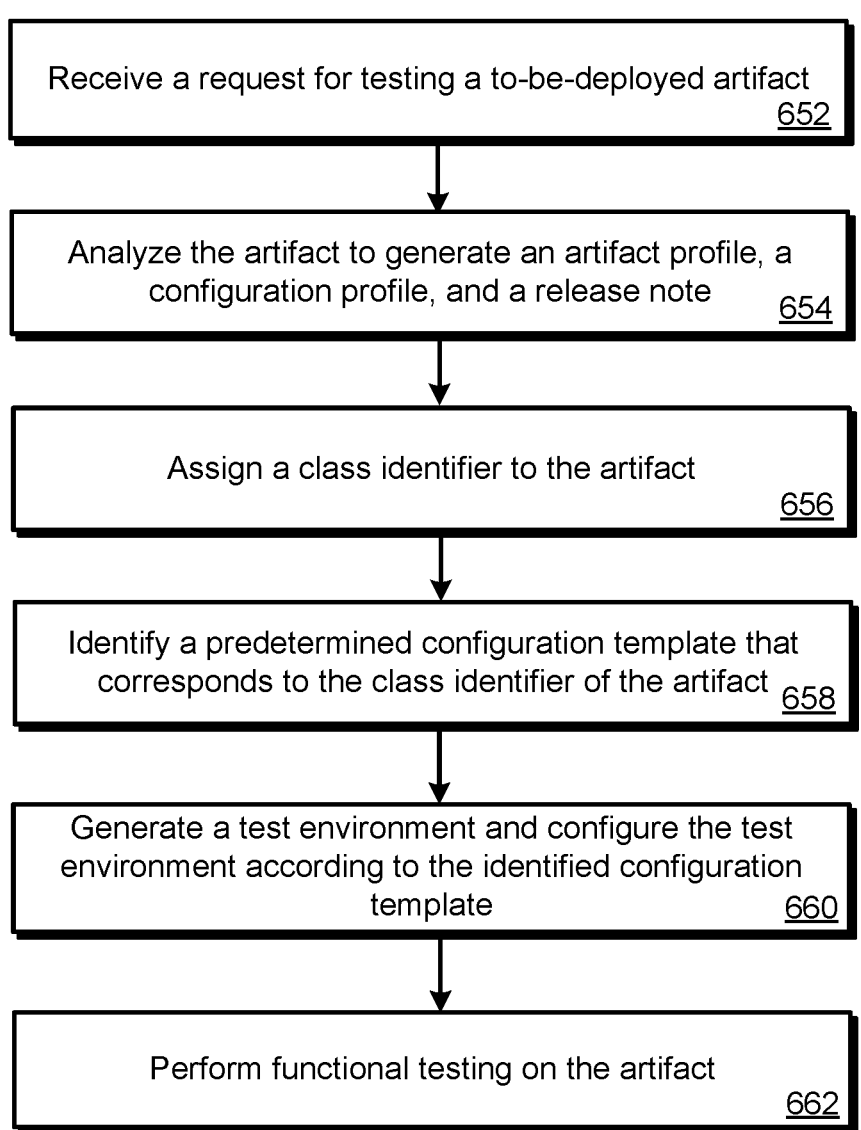

Receive a request for testing a to-be-deployed artifact
652

Analyze the artifact to generate an artifact profile, a configuration profile, and a release note
654

Assign a class identifier to the artifact
656

Identify a predetermined configuration template that corresponds to the class identifier of the artifact
658

Generate a test environment and configure the test environment according to the identified configuration template
660

Perform functional testing on the artifact
662

WORKING
MEMORY

760

OPERATING
SYSTEM

APPLICATION(S)

765

735

PROCESSOR(S) 710

STORAGE DEVICE(S) 725

INPUT DEVICE(S) 715

OUTPUT DEVICE(S) 720

COMMUNICATIONS
SUBSYSTEMS 730

VENDOR ONBOARDING AND PRE-DEPLOYMENT SERVICE TESTING

BACKGROUND

With the increasing adoption of 5G cellular networks, organizations are often reliant on third-party vendors to provide specialized software services for deployment on these networks and provisioning various services to end-users. The evolution of 5G networks has brought about the advent of open radio access networks (O-RAN) and virtualization, allowing cellular network components to be implemented as software on general-purpose hardware platforms. This architectural shift has created opportunities for multiple vendors to deploy their software solutions on the same 5G network infrastructure, for example, using different network slices. It is desirable for receiving, testing, and validating software services from multiple vendors to ensure integration, interoperability, performance, and reliability before deployment within the 5G network environment.

SUMMARY

In accordance with some embodiments of the present disclosure, a computer-implemented method is provided. In one example, the method includes: receiving, in an automated test control system in connection with a cellular network implemented on a cloud-computing platform, an artifact associated with a service provided by a service vendor, and the service is to be deployed on the cellular network. The method further includes storing the received artifact in an untrusted artifacts database, generating and configuring a first test environment on a first virtual private cloud of the cloud-computing platform, automatically performing validation on the received artifact in the first test environment, in response to a determination that the artifact is validated, performing functional testing on the validated artifact in the first test environment, and in response to a determination that the artifact passes the functional testing, signing the artifact and storing the signed artifact in a repository.

In accordance with some embodiments of the present disclosure, an automated test control system is provided. In one example, the automated test control system includes: one or more processors and a computer-readable storage media storing computer-executable instructions. The computer-executable instructions, when executed by the one or more processors, cause the automated test control system to: receive an artifact associated with a service provided by a service vendor, the service to be deployed on the cellular network, store the received artifact in an untrusted artifacts database, generate and configure a first test environment on a first virtual private cloud of the cloud-computing platform, automatically perform validation on the received artifact in the first test environment, in response to a determination that the artifact is validated, perform functional testing on the validated artifact in the first test environment, and in response to a determination that the artifact passes the functional testing, sign the artifact and store the signed artifact in a repository.

In accordance with some embodiments, the present disclosure also provides a non-transitory machine-readable storage medium encoded with instructions, the instructions executable to cause one or more electronic processors of a system to perform any one of the methods described in the present disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6B is a flow diagram illustrating an example method for pre-deployment service testing, according to various embodiments.

FIG. 6C is a flow diagram illustrating an example method for pre-deployment service testing, according to various embodiments.

DETAILED DESCRIPTION

The present disclosure provides techniques related to service vendor onboarding process. According to some embodiments, a streamlined and integrated service vendor onboarding process is provided. The process includes receiving, validating, and testing software services and artifacts provided by third-party service vendors in test environments of a cloud-based cellular network, before deployment of the software services on a production environment of the cloud-based cellular network. The present disclosure provides techniques related to virtualization of test environments and various testing layers of the test environment for pre-deployment artifact testing on a cloud-computing platform.

Figure 1:
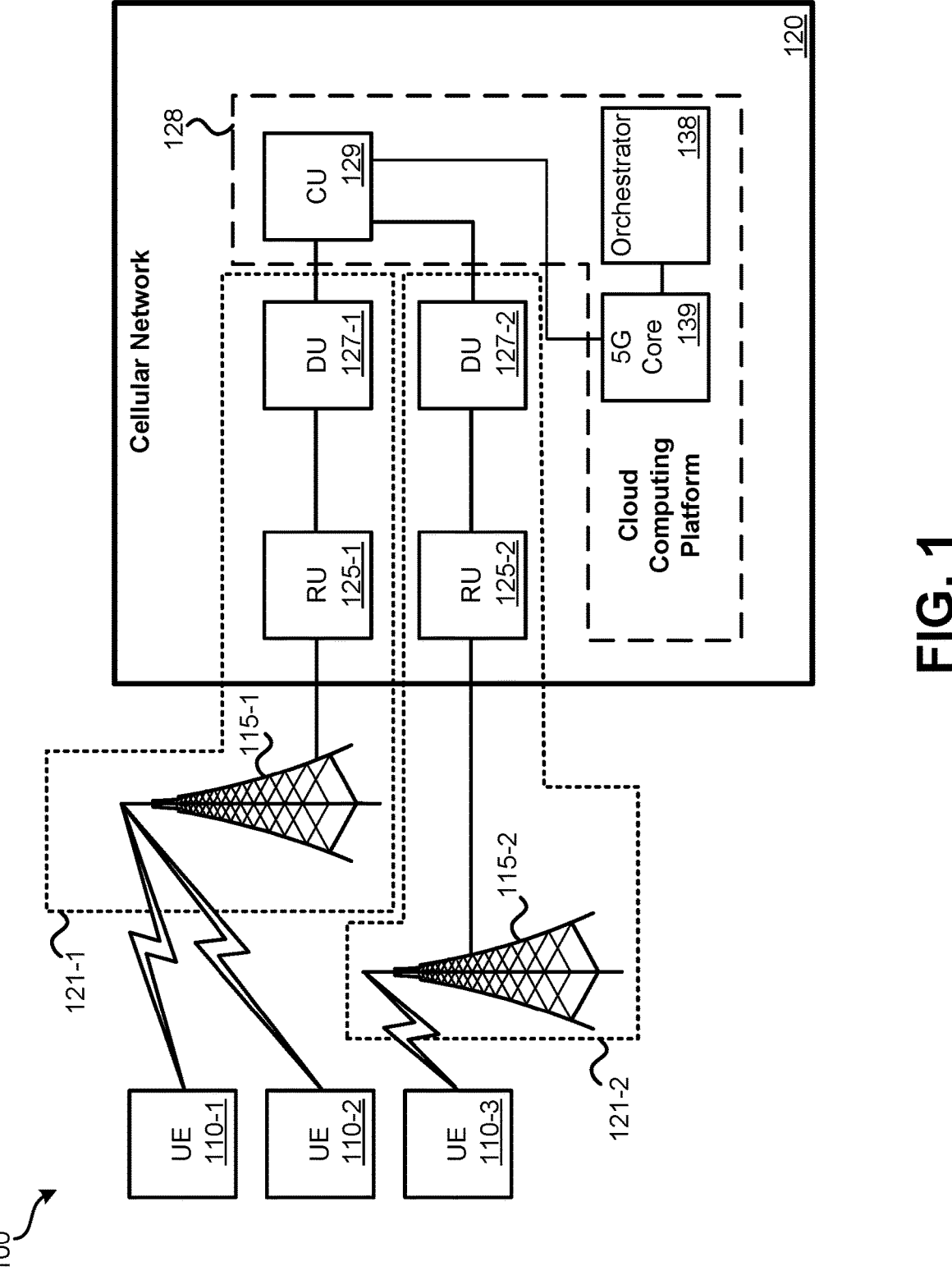
FIG. 1 is a schematic diagram illustrating an example of a hybrid cloud cellular network, according to various embodiments.

FIG. 1 illustrates a block diagram of a hybrid cellular network system 100 (hereinafter "system 100"). System 100 can include a 5G New Radio (NR) cellular network; as noted, other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In an open radio access network (O-RAN), because components can be implemented as specialized software executed on general-purpose hardware, except for components that need to receive and transmit RF, the functionality of the various components can be executed by general-purpose servers. For at least some components, the hardware may be maintained by a separate cloud-service computing platform provider. Therefore, the cellular network operator may operate some hardware, such as RUs and local computing resources on which DUs are executed, such components may be connected with a cloud-computing platform on which other cellular network functions, such as the core and CUs are executed.

UE 110 can represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various BSs of cellular network 120. As illustrated, two BSs are illustrated: BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on cloud-computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 can execute CU 129, 5G core 139, and orchestrator 138. The cloud-computing platform 128 can be a third-party cloud-based computing platform or a cloud-based computing platform operated by the same entity that operates the RAN. Cloud-computing platform 128 may have the ability to devote additional hardware resources to cloud-based cellular network components or implement additional instances of such components when requested.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU for test, orchestrator 138 can perform a pipeline of calling the DU code from a software repository incorporated as part of, or separate from cellular network 120, pulling corresponding configuration files (e.g., helm charts), creating Kubernetes nodes/pods, loading DU containers, configuring the DU, and activating other support functions (e.g., Prometheus, instances/connections to test tools).

As previously noted, a cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Figure 2:
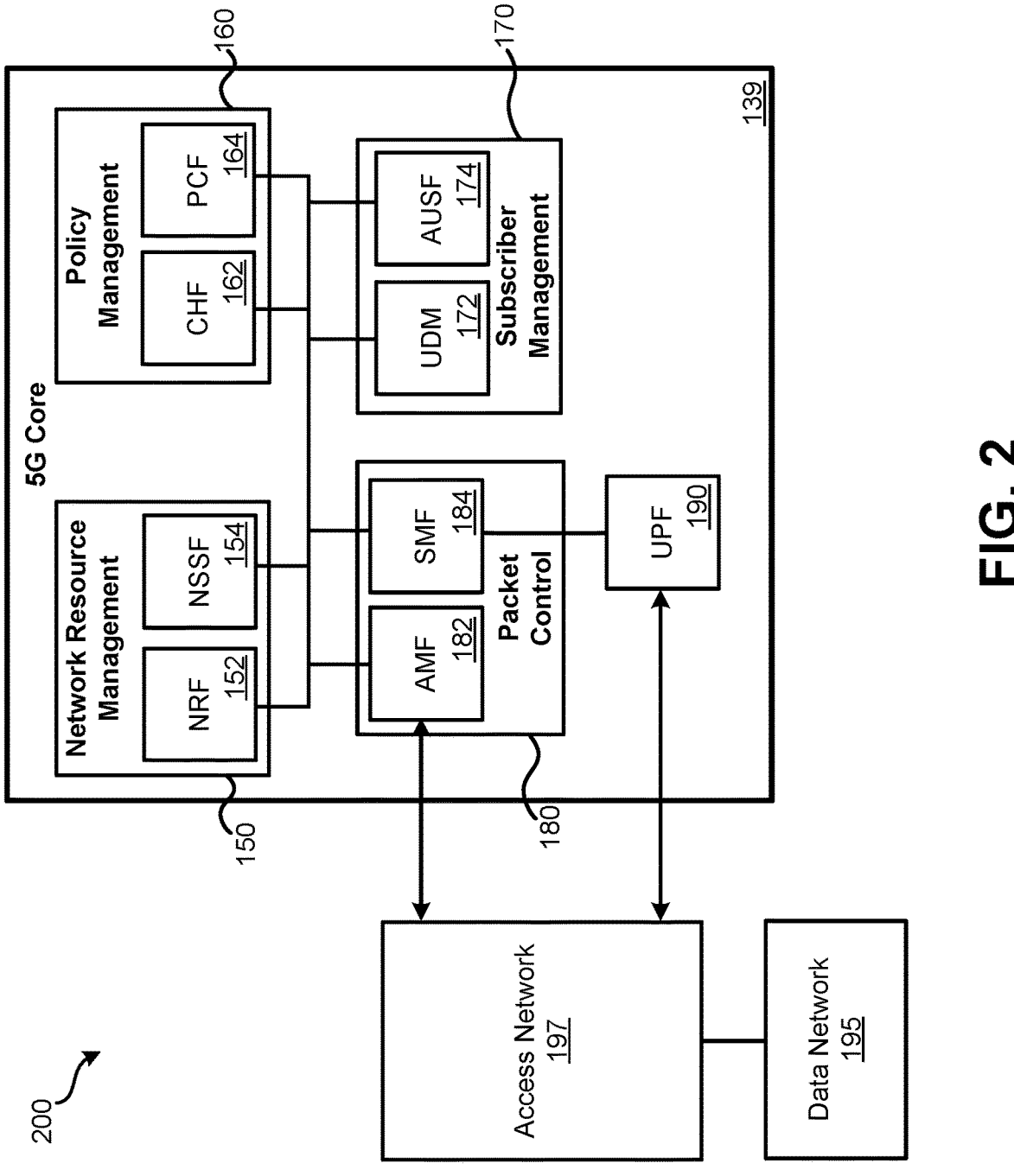
FIG. 2 is a schematic block diagram illustrating an example of a 5G core, according to various embodiments.

FIG. 2 illustrates a block diagram of a cellular network core, which can represent 5G core 139. 5G core 139 can be implemented on a cloud-computing platform. 5G core 139 can be physically distributed across data centers, or located at a central national data center (NDC), and can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

The functions illustrated in FIG. 2 as part of 5G core 139 are merely exemplary. Many more or different functions may be implemented in the cellular network core and may vary by slice. The amount of computing resources devoted to a particular function can vary by slice.

Figure 3:
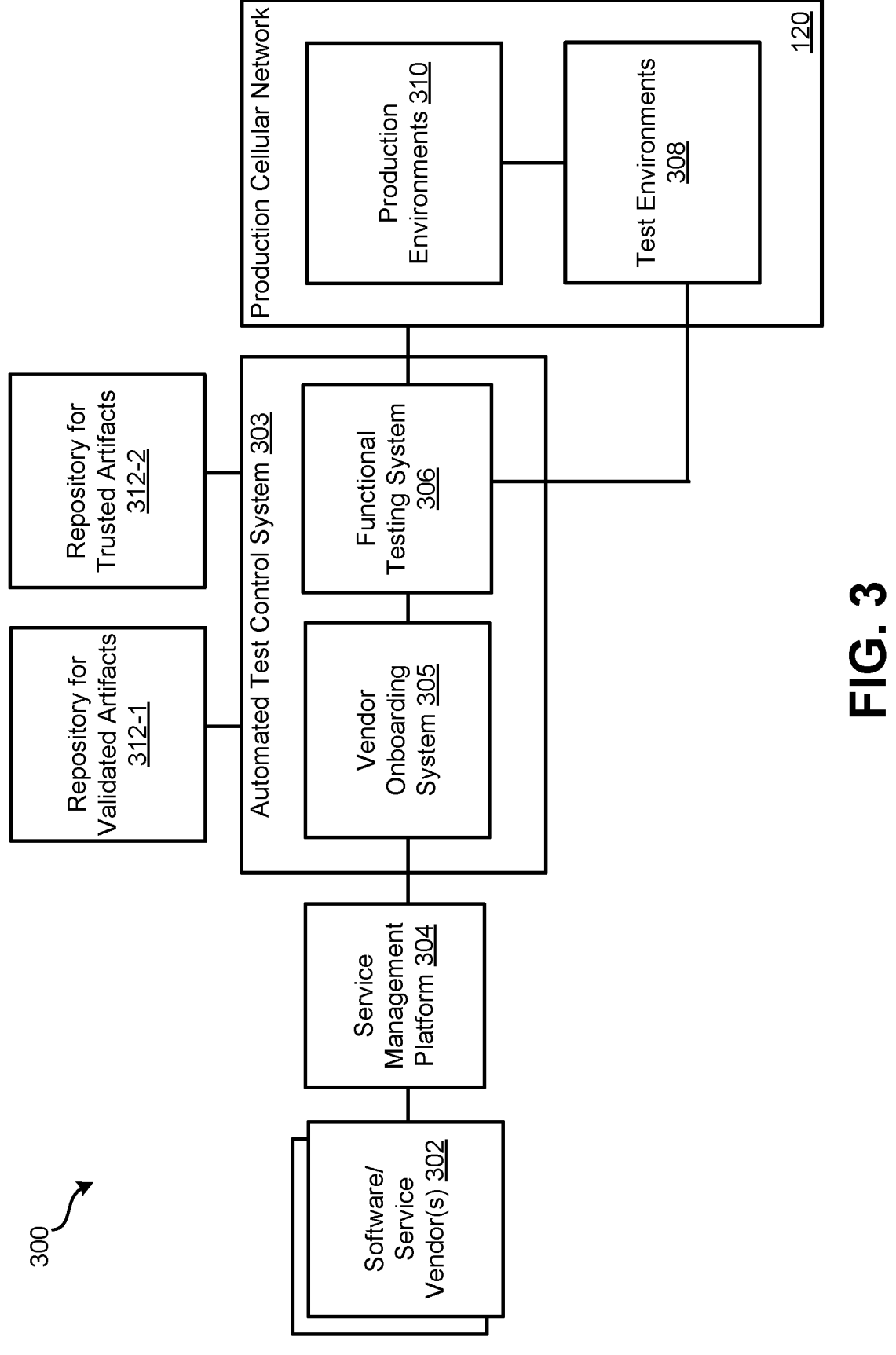
FIG. 3 is a schematic diagram illustrating an example communications system, according to various embodiments.

FIG. 3 illustrates an example of a communications system 300 (hereinafter system 300) for deployment of software services on a cellular network 120 shown in FIG. 1, according to various embodiments. In the illustrated example, the system 300 includes, among other components, multiple software/application/service vendors 302 (hereinafter "service vendors 302"), a service management platform 304, an automated test control system 303, one or more test environments 308, one or more production environments 310 established on a production cellular network 120, and one or more repositories 312 (e.g., a repository for validated artifacts 312-1 and a repository for trusted artifacts 312-2). The automated test control system 303 further includes a vendor onboarding system 305 and a functional testing system 306. Additional or alternative components may be included in the system 300. Various components of the system 300 are in communication with each other for data transmission.

In some embodiments, the service vendors 302 may be third-party service providers specialized in developing software/applications/services using Continuous Integration and Continuous Deployment (CI/CD) methodologies and deploying them on the cellular network 120. As a brief example, developers of a service vendor 302 may use a version control system to manage source codes of the new application or service, set up repositories and branches to enable code versioning, and configure a selected CI tool to automatically trigger builds when code changes are pushed to the repository. Build scripts or configuration files (e.g., YAML) can be generated and defined to specify the required build steps, dependencies, and environment configurations. Unit tests are incorporated into the CI pipeline to verify the correctness and functionality of individual components or units within the new application or new service. Static code analysis tools may be used to analyze code quality, identify potential issues, and enforce coding standards. Once the new application or new service is built, the complied code and any required dependencies may be packaged into an artifact in a deployable format. A version number may be assigned to the generated artifact. Relevant metadata and documentation may be included in the artifact. The metadata may include details like the artifact name, version, release notes, licensing information, authorship, and any other pertinent information that helps consumers of the artifact understand its purpose and usage. In some embodiments, the artifact generation process may be automated within the CI/CD pipeline. After successfully building and packaging the new application or new service, the artifact is automatically generated and versioned.

As mentioned above, the artifact refers to a packaged and versioned software component or set of files that are ready for deployment to a target environment and contains the necessary files, configurations, dependencies, and any other resources required to execute the software application or service in the target environment. The artifact may take various forms such as binary packages, archive files, container images (Docker images or images), configuration files, database scripts, and so on. The images encapsulate the application code, dependencies, and configurations in a portable and self-contained unit that can be deployed and run on container platforms. In some embodiments, a service may include multiple artifacts, and each artifact within the application service may contribute to a certain functionality of the application service. In some embodiments, the application service provided by the service vendor is a Software as a Service (SaaS) application.

The service management platform 304 can act as an intermediary between the service vendors 302 and the automated test control system 303. The service management platform 304 is configured to receive to-be-deployed services and artifacts associated with the services from the service vendors 302, push the received services and artifacts to the automated test control system 303, and facilitate communication, integration, and control over the services provided by the service vendors 302. In some embodiments, the service management platform 304 is an Application Programming Interface (API) management platform, such as Google Cloud Platform (Apigee), Azure API Management, etc.

Within the automated test control system 303, the vendor onboarding system 305 is responsible for receiving and responding to the service requests from the service vendors 302, acting as an entry point, processing and validating these requests and artifacts according to pre-determined criteria. The vendor onboarding system 305 is also configured to generate and assign a gateway for the services and artifacts associated with the services to be received. The gateway serves as a secure endpoint through which the service vendors can transmit their services and artifacts to the functional testing system 306. The functional testing system

306 can generate and configure one or more test environments for testing the services and artifacts. The various test environments 308 provide the necessary infrastructure, resources, and configurations to simulate the production environment. The automated test control system 303 can perform various tests and validation of the services and artifacts. The tests and validation may include service scanning, immutability check, functional testing, performance testing, security testing, compatibility testing, among others, to ensure the services and artifacts meet the required standards and perform as expected. The automated test control system 303 is further configured to transmit the validated and trusted services respectively to the repository for validated artifacts 312-1 and the repository for trusted artifacts 312-2. The repositories 312 can be an artifactory and act as a centralized location for storing and managing the validated/trusted services and their associated artifacts. The repositories 312 may facilitate version control, access control, and easy retrieval of the validated/trusted services. The automated test control system 303 is further configured to push the validated/trusted services to the production environments 310 of the cellular network 120 for deployment of the validated/trusted services in the production environments 310. The thoroughly tested and validated services can be made available to users/clients on the production cellular network. Additional examples of the various components of FIG. 3 are further described below with reference to FIGS. 5A-5D.

Figure 4:
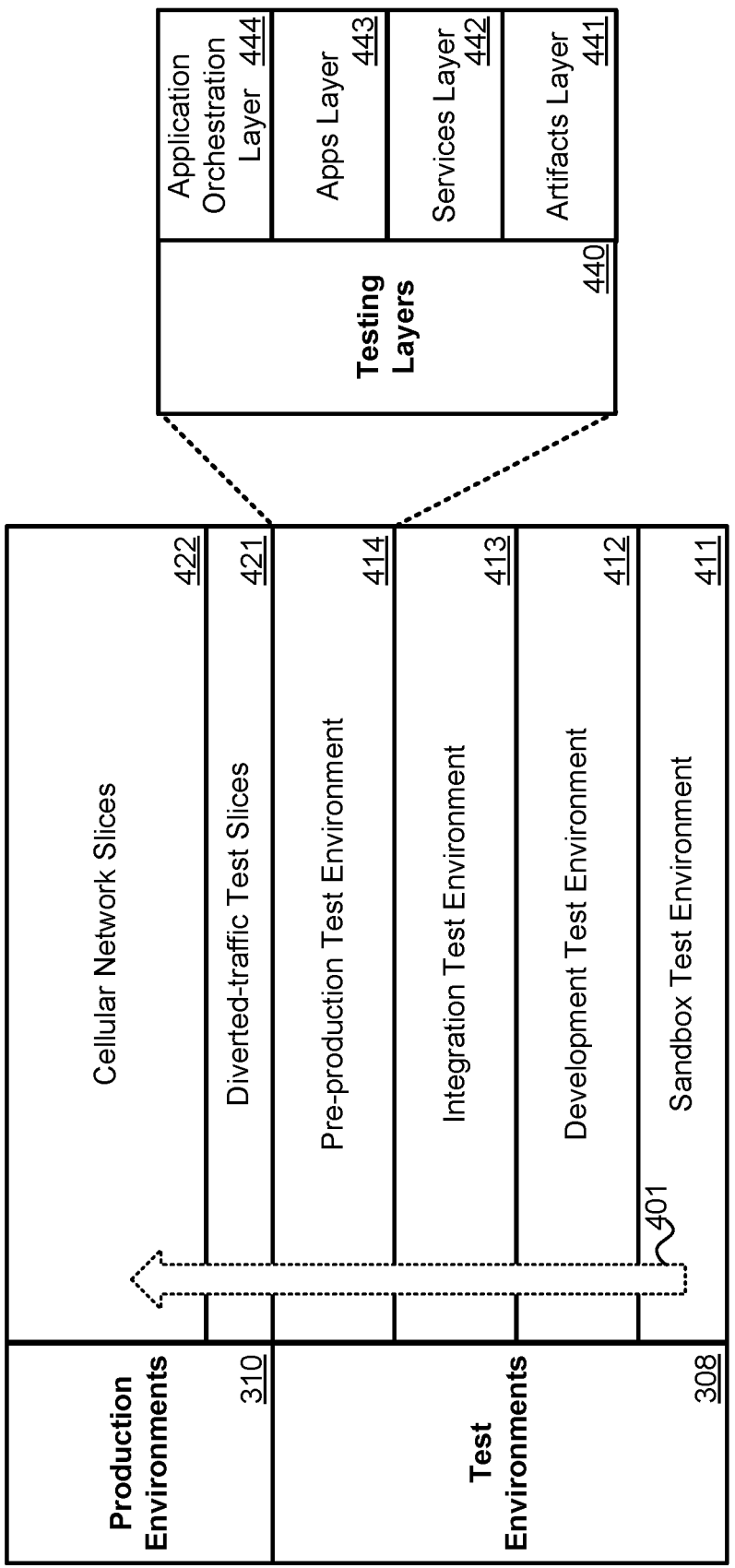
FIG. 4 is a schematic diagram illustrating an example of a multi-environment cellular network test hierarchy, according to various embodiments.

FIG. 4 is a schematic diagram illustrating an example of a cellular network test environment hierarchy 400 (hereinafter "hierarchy 400"). In the illustrated example, the hierarchy 400 includes two sets of environments: a set of test environments 308 and a set of production environments 310. Test environments 308 exists for the purpose of testing services and artifacts to be deployed in the production environment 310. Production environment 310 handles live communication traffic by clients of the cellular network provider. Typically, testing of the functionality, communication, and ability to meet specification, and handle traffic is performed starting from a lower-level test environment progressing up to one or more higher levels. Not all specific test environments need to be tested; rather, the services and artifacts can be tested in whichever test environments deemed necessary. For example, within test environment 308, four test environment levels may be present: sandbox test environment 411 (which can also be referred to as a minimal complexity test environment); development test environment 412; integration test environment 413; and pre-production test environment 414. Testing may be performed in order from the least complexity through the production environment, as indicated by arrow 401. Further, within each test environment 411-414, various layers may be present, which may each need to be tested.

In the sandbox test environment 411, initial testing and experimentation may be performed. Services and artifacts are tested in a controlled and isolated environment with limited complexity. The testing may aim to validate basic functionality, check for any immediate issues or bugs, and assess the feasibility of the services or artifacts. In the development test environment 412, the scope of the testing may expand, and the integration of services and artifacts is tested more comprehensively. Functional testing may be conducted to ensure the services and artifacts meet the specified requirements. In some embodiments, unit testing, component testing, and system testing may be performed in the development test environment 412 to validate individual functionalities and their interactions within the service. In the development test environment 412, testing of the interoperability and compatibility of services and artifacts may be performed within the larger system. Different components, services, or subsystems may be combined to evaluate the interactions and data flow. Integration testing is performed to assess whether the services and artifacts work harmoniously and exchange data correctly. Integration testing may further include validating interfaces, data transformations, communication protocols, and error handling across interconnected services.

In the pre-production test environment 414, thorough end-to-end testing is performed to validate the readiness of services and artifacts for deployment to the production environment. The testing activities performed here may include regression testing, performance testing, scalability testing, security testing, and user acceptance testing. The testing may be performed to simulate real-world scenarios, identify and resolve any remaining defects or performance bottlenecks, and ensure the services and artifacts meet the required quality standards before deployment to the live production environment.

A cellular network, such as a 5G cellular network, can have network slices that handle cellular network traffic for particular customers and/or particular uses. Within production environments 310, only a small number of slices (e.g., one, two, three, etc.) may first use the modified cellular network as part of diverted-traffic test slices 421 while the remainder of slices continue using the original production environment. Therefore, a small percentage of live cellular network traffic may first use the modified cellular network. Further, testing of to-be-deployed services may be performed on one or more of test environments 411-414 of diverted-traffic test slices 421 to ensure that the modified cellular network is performing as expected in the production environment. The number of slices used as part of diverted-traffic test slices 421 may be increased during testing to put additional traffic and stress on the modified cellular network.

Once testing within diverted-traffic test slices 421 has been satisfied, cellular network slices 422, representing the remaining or all of the slices of the cellular network production environment, are processed and transmitted using the modified cellular network. Slices and environments can be dynamic and elastic in nature. They may exist for a short period of time for a specific purpose, such as to perform a test. Multiple slices may be instantiated to accelerate test scenarios in parallel.

As mentioned above, multiple layers may be included within each test environment. As illustrated in FIG. 4, for example, the pre-deployment test environment may include testing layers 440, which further include, among other layers, an artifacts layer 441, a services layer 442, an application layer 443, and an application orchestration layer 444. Test of to-be-deployed artifacts provided by service vendors may be carried out on each one of the testing layers 440 in the test environment.

The artifacts layer 441 may include the individual components or artifacts of a to-be-deployed services. These artifacts can include software packages, libraries, scripts, configuration files, or any other elements that contribute to the overall functionality of the service. Testing at the artifacts layer 441 may further include verifying the integrity and correctness of individual artifacts, checking for compatibility and compliance with the requirements and standards for production environment; assessing the performance, scalability, and reliability of the artifacts; conducting static analysis, code reviews, or automated checks on the artifacts; checking the version and management profile of the artifacts.

The services layer 442 deals with the higher-level functionality of the services. Services can be accessed through defined interfaces and are typically designed to be reusable and interoperable. Testing at the services layer 442 validates the behavior, performance, and integration of the to-be-deployed services. Testing at the services layer 442 may include: verifying the correct functioning of service inputs, outputs, and operations, assessing service contracts, including data formats, communication protocols, and error handling; testing service interoperability and compatibility with other system components or external services; evaluating service performance, scalability, and responsiveness; and conducting functional, smoke, integration, and regression testing of the services.

The application layer 443 deals with the applications built on top of the underlying services and artifacts. The application layer 443 may involve testing the user-facing aspects of the applications with respect to the functionality, usability, and user experience. In some embodiments, the application layer 443 includes verifying the visual aspects, layout, and usability of the user interface; testing the different features, workflows, and use cases of the application according to pre-determined requirements; validating the accuracy, integrity, and security of data processing operations within the application; and verifying the integration of the application with the underlying services.

The application orchestration layer 444 deals with the coordination and interaction between different services, artifacts, or applications in the test environment. Testing of services on the application orchestration layer 444 can involve reconfiguring, instantiating, and rearranging components of the cellular network in order to realize particular objectives for testing. Testing of services on the application orchestration layer 444 may further include validating the flow of data and control between different system components, services, or applications; performing end-to-end test on the interactions, data exchange, and communication between various components or services to check smoothness of operations and the outcomes; verifying the proper integration and interoperability of various components or services; identifying conflicts and issues regarding stability and functionality; validating error messages, error logging, and the resilience in handling unexpected scenarios; and testing response times, resource utilization, and system performance under various conditions mimicking the production environment.

The above layers are provided for illustrative purposes only. Additional or alternative layers may be included in one or more of the test environments 308. For example, a physical infrastructure layer may include simulation of one or more servers and the capabilities of such servers and communication between such servers. A virtual machine (VM) layer (e.g., the layer at which containers of components can be deployed in an O-RAN network) may be included. The virtual machine layer can be used to deploy and drain cloud-based instances of cellular network componentry, such as DUs, CUs, cloud-based applications, 5G core componentry, etc. during service testing. A network function layer (e.g., the layer at which the confirmation, management, and coordination of processes, tasks, and services on the cellular network are performed) may be included. When the testing of services is performed on the network function layer, various alarms or triggers may be triggered to see how the network function reacts, various network loads may be applied to the cellular network to determine if services are properly adapted and instantiated to meet various objectives, such as the SLAs of one or more network slices. Multiple instances of the same network function may be instantiated with different allocations of resources. Each of these instances can then be tested to see the amount of resources needed to effectively operate the network function. Other layers such as security layer, compliance layer, recovery layer, etc., may also be included in one or more of the test environments 308.

Figure 5A:
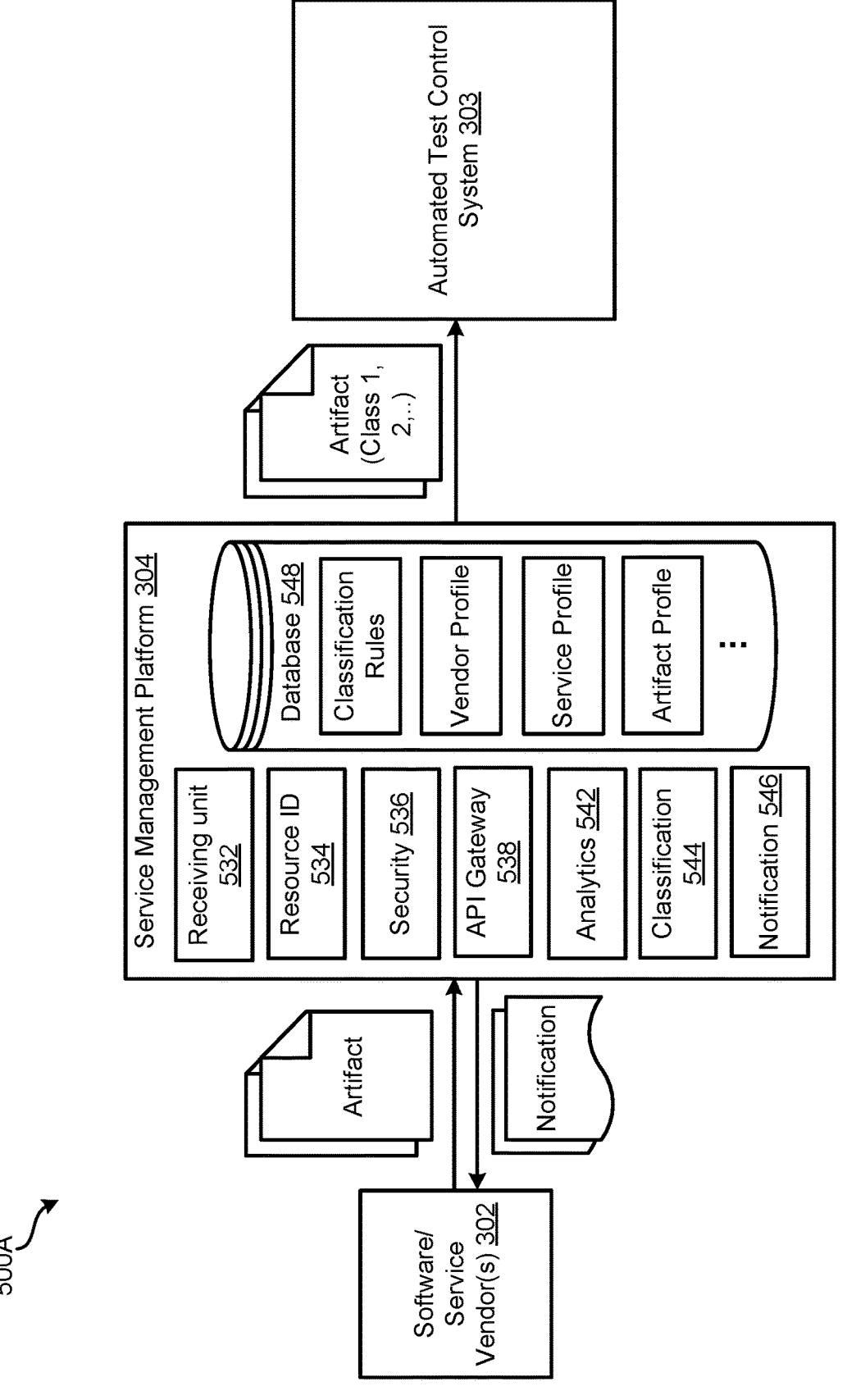
FIG. 5A is a schematic diagram illustrating another example of a communications system, according to various embodiments.

FIG. 5A is a schematic diagram illustrating another example of a communications system 500A (hereinafter "system 500A") according to various embodiments. In the illustrated example, the system 500A includes, among other components, the service vendor 302, the service management platform 304, and the automated test control system 303. The service management platform 304 and the automated test control system 303 may be operated by separate operators or otherwise operated by the same operator. In some embodiments, the service management platform 304 and the automated test control system 303 are integrated as a single system.

In the illustrated example of FIG. 5A, the service management platform 304 includes, among other components, a receiving unit 532, a resource identifier generation engine 534, a security component 536, an API gateway 538, an analytics engine 542, a classification engine 544, a notification engine 546, and a database 548. The service management platform 304 is in communication with the service vendors 302 and the automated test control system 303. Each component in the system 500A may be a hardware piece, a software piece, or a combination of both.

As mentioned above, the service management platform 304 acts as an intermediary that provides a range of components to facilitate API management and service vendor onboarding for pre-deployment service testing with the automated test control system 303. The receiving unit 532 of the service management platform 304 is responsible for receiving service requests from the service vendors 302 and performing initial processing and routing of the service requests to the appropriate components for further handling. The resource identifier generation engine 534 is responsible for generating a resource identifier locator, such as Uniform Resource Locator (URL), and assigning the resource identifier locator to the service vendor 302 for transmitting artifacts of the requested service to the automated test control system 303 using the assigned resource identifier locator.

The security component 536 of the service management platform 304 is responsible for establishing secure communication channels between the service vendors 302 and the automated test control system 303. The security component 536 is configured to perform authentication and authorization of the service vendors 302, for example, verifying the identities of the service vendors 302. The security component 536 may further protect data transmitted between the service vendors 302 and the automated test control system 303 using encryption techniques to secure data in transit and prevent unauthorized access or interception.

The API gateway 538 serves as an intermediary that facilitates secure and controlled communication between the service vendors 302 and the automated test control system 303. The API gateway 538 may receive incoming service requests from the service vendor and routes the service requests to the appropriate APIs or services within the automated test control system 303, based on the pre-determined routing rules and policies. The API gateway 538 can also perform protocol transformation if the service vendor 302 uses a different communication protocol from the protocols supported by the automated test control system 303. The API gateway 538 may enforce security measures and access control policies on the service requests coming from the service vendor 302, manage/monitor the incoming traffic from the service vendor 302, perform data transformation, translation, or validation on the incoming service requests and/or responses to the service requests from the automated test control system 303, and capture relevant metadata, request/response information, and usage statistics regarding the communication between the service vendors 302 and the automated test control system 303.

The analytics engine 542 is responsible for processing the received service request and retrieving relevant information regarding the vendor identity, vendor registration status, vendor type, service type, application type, and artifact type, among others. The analytics engine 542 may be configured to generate, among other profiles, a vendor profile for the vendor, a service profile for the requested service, and an artifact profile for the artifact of the requested service. The vendor profile may include vendor data regarding vendor identity, vendor registration status, vendor type, as well as historical data regarding the vendor. The service profile may include service data regarding service type, application type, functionality, and other relevant information for service registration and testing. The artifact profile may include data regarding artifact type, artifact version, integration level, performance attributes, compatibility, user interaction type, regulatory compliance, lifecycle stages, as well as historical artifact data regarding previous artifacts of the same service previously requested. The vendor profile, service profile, and artifact profile may be transmitted to the automated test control system 303, along with the artifact of the requested service. It should be noted that the artifact profile may be alternatively generated by the vendor onboarding system 305 (FIG. 5B) in other embodiments.

The classification engine 544 is responsible for automatically assigning a class identifier to the artifact of the request service. In some embodiments, the classification engine 544 may generate/establish multiple classes/categories of artifacts according to a predetermined classification rule. Classification of the artifacts may hinge on diverse criteria including the attributes of the service in question, the service type, the type of artifact, functionality, performance attributes, among others. The classification engine 544 can discern a predetermined artifact class that matches and subsequently tag the artifact with the corresponding class identifier. In scenarios where no existing artifact class aligns, the classification engine 544 has the capacity to generate a fresh artifact class, drawing from the distinctive features/ attributes related to the artifact itself and/or the associated requested service. For example, the artifacts can be classified into different classes by the service type such as authentication and identity management services (e.g., user authentication service, single sign-on service), payment processing (e.g., payment gateway service, credit card processing service), geolocation and mapping (e.g., geolocation tracking service, map integration service), search and analytics (e.g., search engine integration service, data analytics service), content delivery (e.g., content delivery network (CDN) service, media streaming service), Internet-of-Things (IoT) services, and so on. In some embodiments, the artifact may have two or more class identifiers assigned thereto if the multiple class identifiers are identified. The artifact with the class identifier is further transmitted to the automated test control system 303 through the API gateway 538. It should be noted that the classification engine 544 may alternatively be a component (i.e., the artifact classification engine 545) of the vendor onboarding system 305 in other embodiments. It should be noted that the classification engine 544 may be alternatively included in the vendor onboarding system 305 (i.e., the artifact classification engine 545 of FIG. 5B) in other embodiments.

The notification engine 546 is responsible for communicating with the service vendor 302. The notification engine 546 can transmit notifications, alerts, acknowledgments, and any relevant information between the service management platform 304 and the service vendor 302. The notification engine 546 can inform the service vendor 302 about the status of their requested services, the results of artifact validation and testing, as well as any additional information or actions required.

The database 548 is responsible for storing various data received in and generated by the service management platform 304. For example, various profiles, rules, and policies may be stored in the database 548, including but not limited to the classification rules, vendor profile, service profile, artifact profile, inventory of class identifiers, and so on. The classified artifact (i.e., artifact labeled with the class identifier) may be transmitted to the automated test control system 303, through the API gateway 538 using the dedicated resource identifier locator.

Figure 5B:
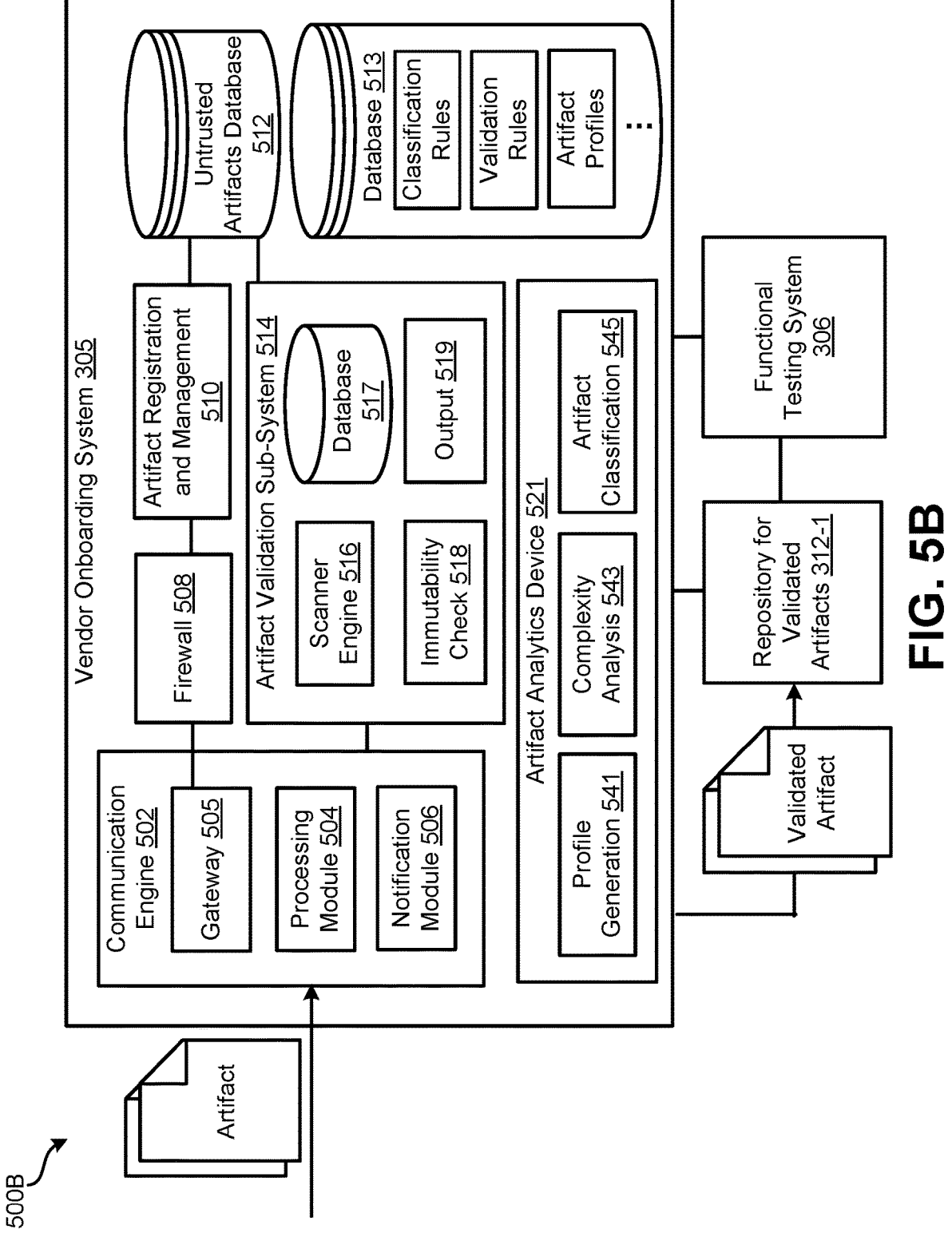
FIG. 5B is a schematic diagram illustrating another example of a communications system, according to various embodiments.

FIG. 5B is a schematic diagram illustrating another example of a communications system 500B (hereinafter "system 500B") according to various embodiments. In the illustrated example, the system 500B includes, among other components, the vendor onboarding system 305, the repository for validated artifacts 312-1, and the functional testing system 306. As described above, the vendor onboarding system and the functional testing system 306 may be integrated into the automated test control system 303. The vendor onboarding system 305 may further include, among other components, a communication engine 502, a firewall 508, an artifact registration and management device 510, an untrusted artifacts database 512, a database 513, an artifact validation sub-system 514, and an artifact analytics device 521. The vendor onboarding system 305 is in communication with the service management platform 304, the repository for validated artifacts 312-1, and the functional testing system 306. In some embodiments, vendor onboarding system 305 may also be in communication with service vendors 302.

The automated test control system 303 may be executed on a cloud-computing platform (e.g., the cloud-computing platform where the production cellular network 120 is executed). Operating the automated test control system 303 on a cloud-computing platform allows for efficient resource allocation, dynamic scaling, and ease of management. The cloud-computing platform may provide the underlying infrastructure, including virtual machines, storage, networking, and security services, to support the operation of the automated test control system 303. The cloud-computing platform may enable the automated test control system 303 to leverage the cloud's computing power, storage capacity, and network capabilities for executing the required testing processes and managing the test environments effectively.

In some embodiments, the automated test control system 303 is executed on a virtual private cloud (VPC) of the cloud-computing platform. A VPC provides a logically isolated section of the cloud infrastructure where the automated test control system 303 can operate. The automated test control system 303 can take advantage of the virtualization, on-demand resource provisioning, and network isolation provided by the VPC to allow for testing and deployment activities in a flexible and scalable environment.

Within the vendor onboarding system 305, the communication engine 502 may further include a gateway 505, a processing module 504, and a notification module 506. The gateway 505 is configured to provide a secure entry point for receiving artifacts sent from service vendor 302. The gateway 505 may be an Internet gateway. In some embodiments, the service vendor 302 receives the resource identifier locator (e.g., a URL) generated and assigned by the resource identifier generation engine 534 of the service management platform 304. The service vendor 302 may transmit the artifacts associated with the requested service using the assigned URL to the vendor onboarding system 305 over Internet. The gateway 505 receives the transmitted artifacts over the Internet and performs necessary security checks, routing, and forwarding to the appropriate processing module 504 within the automated test control system 303 for further processing. The gateway 505 may also receive other information or data regarding the vendor and the artifact, such as the vendor profile, service profile, and artifact profile described above.

The processing module 504 receives the artifacts from the gateway 505 and handles their further processing. The processing module 504 may perform initial verification and extraction of relevant information from the received artifacts, and apply specific rules, policies, or algorithms to determine whether the artifacts should be processed within the automated test control system 303 for testing in test environments.

The notification module 506 is responsible for transmitting notifications or acknowledgments to the service management platform 304 and/or the service vendor 302 regarding the status or outcome of the artifact processing. The notification module 506 may send notifications to the service management platform 304 and/or the service vendor 302 to inform them about the successful receipt, processing progress, or any potential issues related to the transmitted artifacts. The notification module 506 may further send an inquiry or request for additional information regarding the artifacts for continuation or renewal of the validation.

The firewall 508 acts as a barrier between the internal network of the automated test control system 303 and external networks, such as the Internet or other connected networks. The firewall 508 is configured to monitor and control incoming and outgoing network traffic and prevent unauthorized access and potential security threats. In some embodiments, the firewall 508 is an application-layer firewall with intelligent policy management. For example, the firewall 508 may further include an advanced firewall manager (ASM) and an intelligent policy infrastructure (IPI). ASM may perform deep inspection and analysis of incoming artifacts, examining the content, structure, and behavior of the data to identify potential threats and malicious activities. ASM may also enforce security policies specific to the services to be tested, ensuring compliance with security standards and protecting against common web-based attacks such as Structured Query Language (SQL) injection, cross-site scripting (XSS), and more. ASM may further identify vulnerabilities within the artifacts, including signature-based detection, behavioral analysis, and anomaly detection. The IPI provides intelligent policy management capabilities and enables the creation of dynamic policies that can adapt and respond to changing circumstances, such as the specific characteristics of the artifacts being tested. The IPI may consider various factors like user roles, application behavior, threat intelligence, and other contextual information to enforce policies that align with the specific requirements of the artifacts and the test environment.

The artifact registration and management device 510 is responsible for registering the requested service and artifact of the service, managing the storage, organization, and retrieval of artifacts that have passed through the firewall 508. The artifact registration and management device 510 is in communication with the untrusted artifacts database 512. The artifacts that have been registered and passed through the firewall 508 are automatically and securely stored in the untrusted artifacts database 512. The artifact registration and management device 510 can maintain metadata associated with each artifact, such as its version, date/time of submission, origin, and any relevant descriptive information, which can be used to track and manage the artifacts. The artifact registration and management device 510 can also categorize and organize the artifacts based on their types, versions, or other relevant criteria. In scenarios where multiple versions of the same artifact exist, the artifact registration and management device 510 can manage the versioning of artifacts and keep track of different versions. The artifact registration and management device 510 can facilitate the retrieval of artifacts from the untrusted artifacts database 512 when required, such that the authorized entities, such as the artifact validation sub-system 514, can access and retrieve the artifacts for further testing or validation.

The untrusted artifacts database 512 is in communication with the artifact registration and management device 510 and the artifact validation sub-system 514. In some embodiments, the untrusted artifacts database 512 may include (or otherwise be established on) Elastic Container Registry (ECR) and/or Simple Storage Service (e.g., Amazon S3). ECR is a fully managed container registry service that enables the storage, management, and deployment of container images, and is specifically designed for hosting artifacts that are Docker container images. ECR provides a secure and scalable environment for storing container artifacts. The untrusted artifacts database 512 may utilize ECR to store container images received from the service vendors, which have passed through the firewall 508 and need further testing and validation. Amazon S3 is an object storage service that allows for storing and retrieving data. Amazon S3 may provide an interface to store and retrieve various types of artifacts, such as files, documents, or other data objects, that have passed the firewall 508 and are awaiting further processing or testing.

The artifact analytics device 521 further includes, among other components, a profile generation engine 541, an artifact complexity analysis engine 543, and an artifacts classification engine 545. The profile generation engine 541 is responsible for extracting key attributes and characteristics from the received artifact and generating an artifact profile, a configuration profile, and a release note associated with the artifact. The profile generation engine 541 may examine the artifact's codebase, dependencies and libraries used by the artifact, metadata about the artifact's source code and origin, and other relevant information to create an artifact profile that encompasses various data points, including vendor identity, service type, artifact type, version information, codebase size, dependency details, and more. In the artifact profile, the various data points may be compiled into a structured format for further analysis. The configuration profile may include configuration settings that affect how the artifact behaves when deployed or executed, such as parameters for customizing the artifact's behavior (e.g., user preferences, feature toggles), network-related configuration parameters (e.g., API endpoints, database connections), environment-specific settings (e.g., development, testing, pre-production deployment, production, etc.), security settings (e.g., encryption keys, access control), among others. The release note may provide documentation about changes, updates, and improvements made to the artifact, such as a list of new features, enhancements, and bug fixes introduced in the current version, compatibility information with other systems or components, known issues, workarounds, or limitations, installation or deployment instructions, links to relevant documentation or external resources, among others.

The artifact complexity analysis engine 543 is responsible for assessing the complexity of the received artifacts. For example, the artifact complexity analysis engine 543 may evaluate multiple dimensions, such as codebase size, number of dependencies, cyclomatic complexity, coupling, duplication, and concurrency aspects of the artifact, and quantify the intricacies in the artifact. In some embodiments, the artifact complexity analysis engine 543 may produce a complexity score or ranking that can aid in identifying an appropriate test environment configuration template for testing as well as resource allocation.

The artifacts classification engine 545 categorizes artifacts into distinct classes based on shared attributes, characteristics, or complexity levels. The artifacts classification engine 545 can employ specific algorithms to examine various aspects of the artifacts, such as vendor identity, service type, application type, artifact type, and complexity metrics. By considering both intrinsic properties and intricacy measures, the artifacts classification engine 545 forms coherent classes of artifacts with similar attributes or complexity profiles and generate a unique class identifier to each class of artifacts. Once the classification is complete, the artifacts classification engine 545 assigns a class identifier linked to the specific class to the received artifact. The class identifier serves as a distinctive label or tag that encapsulates the core attributes and complexity level of the artifact.

In some embodiments, the artifacts complexity analysis engine 543 quantitatively assesses various aspects of the artifacts and assigns a complexity score to each artifact. Based on these scores, the artifacts classification engine 545 can group the artifacts into distinct complexity levels or categories. For example, artifacts with similar complexity scores may be placed in the same complexity class to allow for more targeted testing and validation approaches.

The artifact validation sub-system 514 is configured to retrieve the artifacts from the untrusted artifacts database 512 and perform validation on the artifacts. The artifact validation sub-system 514 may further include, among other components, a scanner engine 516, a database 517, an immutability check engine 518, and an output engine 519. The scanner engine 516 performs scanning and analysis of the artifacts to identify vulnerabilities, security risks, or compliance violation. In some embodiments, the scanner engine 516 performs both static analysis and dynamic analysis. Static analysis includes analyzing the artifacts without execution, examining the source code, configuration profiles, release note, and other relevant information to detect potential issues. Dynamic analysis includes executing the artifacts in the test environment to observe behavior and identify potential issues. The scanner engine 516 may employ a variety of security testing tools, vulnerability scanners, and threat intelligence feeds to enhance its scanning capabilities.

In some embodiments, the scanner engine 516 may access the configuration profile extracted from the artifact, review configuration parameters (e.g., connectivity, behavior, security, etc.) included in the configuration profile and evaluate accuracy and consistency of the parameters according to a predetermined standard specification. The scanner engine 516 may further check the values assigned to each configuration parameter and verify that they are consistent with the intended behavior of the artifact. In one example, if a parameter specifies an API endpoint, the scanner engine 516 may verify that it points to the intended location. The scanner engine 516 may identify dependencies or relationships between configuration parameters and verify that the parameter values are compatible and coherent with each other.

In some embodiments, the scanner engine 516 may access and examine the release note extracted from the artifact, check the release note to verify that it corresponds to the version of the artifact being validated, identify new features introduced, issues resolved, known limitations, and other pertinent information, compare the information in the release note with the expected behavior and functionality of the artifact, validate that any identified issues of the release note have been appropriately addressed and resolved, identify and validate a claim made in the release note regarding improved performance, security enhancements, or other benefits. In some embodiments, the scanner engine 516 can further cross-reference the information contained in the release note with the outcomes and findings from prior testing and validation efforts involving earlier versions of the artifact.

In some embodiments, the scanner engine 516 may examine the artifact profile extracted from the artifact and analyze the attributes and characteristics of the artifact to verify its integrity, compatibility, and compliance with the intended specifications and requirements according to the validation rule. The scanner engine 516 may retrieve the artifact profile, compare the extracted attributes against predefined criteria and specifications to verify that the artifact's attributes align with the expected values and comply with defined standards, confirm that the vendor identity matches the expected vendor associated with the artifact and validate that the vendor' information is accurate and consistent, verify that the indicated service type corresponds to the intended service category or functionality, validate that the artifact's service type aligns with the defined service taxonomy, validate that the artifact type accurately represents the nature of the software component, and cross-reference the attributes in the artifact profile with the information provided in the associated release note to verify that the attributes align with the changes and updates described in the release note.

The immutability check engine 518 is responsible for verifying the integrity and immutability of the artifacts. In some embodiments, the immutability check engine 518 can compare the calculated checksums or cryptographic hashes of the received artifacts with their expected checksums or cryptographic hashes to validate that the artifacts have not been tampered with or modified. For example, an artifact has an expected checksum, which is a value calculated from the data of the artifact using a specific algorithm, such as MD5 or SHA-256. The immutability check engine 518 generates a calculated checksum for the artifact received in the automated test control system 303, using a specific algorithm, such as MD5 or SHA-256. The immutability check engine 518 then compares the calculated checksum with the expected checksum to determine if they match. A match of the checksums indicates that the artifact has not been tampered with or modified during transmission. As another example, an artifact has an expected cryptographic hash value, such as SHA-256 or SHA-3, calculated based on the data of the artifact. Upon receiving the artifact, the immutability check engine 518 computes the cryptographic hash of the artifact based on the received data of the artifact. The immutability check engine 518 then compares the calculated cryptographic hash value with the expected cryptographic hash value to validate the integrity of the artifact. A matching cryptographic hash indicates that the artifact has not been tampered with or modified during transit. On the other hand, any mismatch between the expected and recalculated values (e.g., checksum or cryptographic hash value) indicates that the artifact may have been tampered with or modified.

The database 517 may store the data generated in the scanning and immutability check processes such as the expected and calculated checksums and cryptographic hash values and any other relevant information related to artifact validation. The database 517 also serves as a repository for storing pre-determined validation rules and policies. The rules and policies define the criteria and standards against which the artifacts are evaluated during the testing process. Examples of validation rules and policies can include coding standards, security best practices, compliance requirements, and other relevant guidelines. The stored data can be retrieved from the database 517 by any component of the artifact validation sub-system 514 or the automated test control system 303 as needed. For example, during the artifact validation process, the system may query the database 517 to retrieve the expected checksums, cryptographic hash values, or validation rules associated with a particular artifact. The retrieved data can be used for comparison, verification, or adherence to the specified rules and policies. The database 517 can facilitate the management and updating of the stored data, allow for adding, modifying, or deleting validation rules, policies, and associated artifact data, and support versioning or historical tracking of changes to the rules and policies.

The output engine 519 is configured to generate an output indicating the identified vulnerabilities or risks, enabling further analysis and remediation of the artifacts. The output engine 519 can also generate real-time alerts or notifications when vulnerabilities or risks are detected. The output generated by the output engine 519 also indicates the necessary information required to continue validation.

As described above, the artifact classification engine 545 may be similar to the classification engine 544 of the service management platform 304. The artifact classification engine 545 may generate/establish multiple classes/categories of artifacts according to a predetermined classification rule and assign a class identifier to an incoming artifact of the requested service based on the characteristics of the artifact included in the artifact profile. The classification rule and the artifact profile may be stored in and retrievable from the database 513.

When the received artifact is validated, a notification or acknowledgment of validated artifact may be generated by the notification module 506 and transmitted to the service vendor 302, either directly or indirectly through the service management platform 304. On the other hand, when the received artifact fails the validation process, a notification of a failed artifact may be generated by the notification module 506 and transmitted to the service vendor 302. If additional data or information or update regarding the artifact is needed for further validation, a request for the additional data or information or update may be generated by the notification module 506 and transmitted to the service vendor 302 to prompt the service vendor 302 to provide necessary details or updates required to continue the validation process.

After the artifact is validated by the artifact validation sub-system 514, the validated artifact may be stored in the repository for validated artifacts 312-1. The validated artifact may be further forwarded to and received by the functional testing system 306 for functional and performance testing. The specific functional testing system 306 may vary depending on the characteristics of the artifact and the testing requirements. Examples of the functional testing system 306 may include functional testing tools configured to validate the functional aspects of the artifact, performance testing tools configured to assess performance of the artifact (e.g., response times, throughput, scalability, and resource usage, etc.) under various load and stress conditions, security testing tools configured to identify vulnerabilities and ensuring the artifact's resilience against security threats, compatibility testing tools configured to validate the artifact's compatibility across the cloud-computing platforms. More examples of the functional testing system 306 are described below in details with reference to FIG. 5C.

Figure 5C:
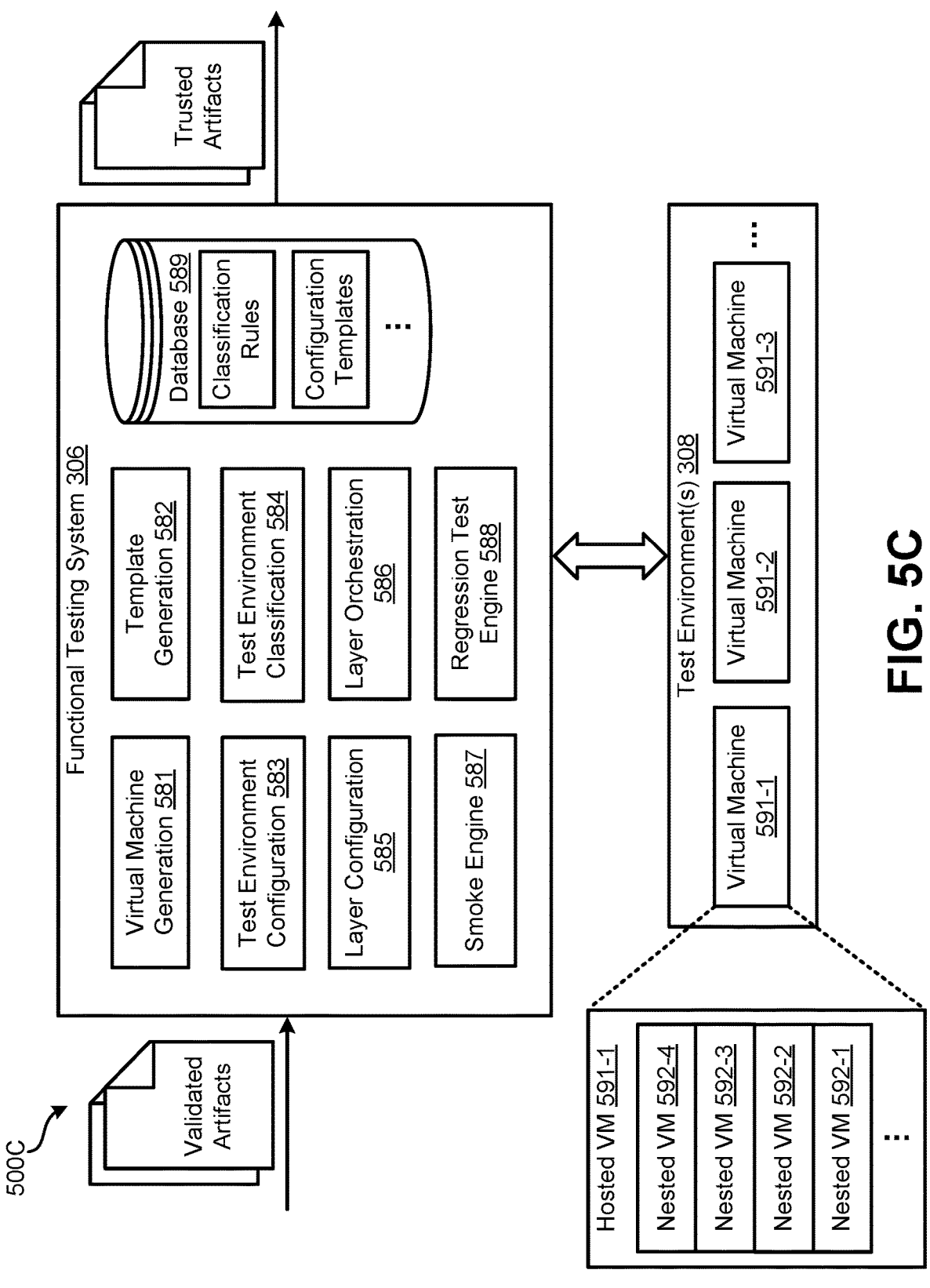
FIG. 5C is a schematic diagram illustrating another example of a communications system, according to various embodiments.

FIG. 5C is a schematic diagram illustrating another example of a communications system 500C (hereinafter "system 500C") according to various embodiments. In the illustrated example, the system 500C includes, among other components, the functional testing system 306 in communication with the test environments 308. Each component in the system 500C may be a hardware piece, a software piece, or a combination of both.

The functional testing system 306 is responsible for receiving validated artifacts from the vendor onboarding system 305 or the repository for validated artifacts 312-1, creating various test environments, and performing functional/performance testing on the validated artifacts in the test environments. The functional testing system 306 may further include, among other components, a virtual machine generation engine 581, a test environment template generation engine 582, a test environment configuration engine 583, a test environment classification engine 584, a layer configuration engine 585, a layer orchestration engine 586, a smoke engine 587, and a regression test engine 588.

The virtual machine generation engine 581 is responsible for generating virtual machines (such as hosted virtual machines and nested virtual machines within a hosted virtual machine) and instantiating the hosted and nested virtual machines for testing the artifact in a test environment and/or each testing layer of the test environment. In some embodiments, multiple virtual machines (e.g., virtual machines 591-1, 591-2, 591-3, etc.) may be generated in one test environment. Simultaneous creation and instantiation of multiple virtual machines within a single test environment allows for the parallel execution of tests on various aspects of the artifact's functionality, behavior, and performance across different virtual machines. Each virtual machine (e.g., 591-1, 591-2, 591-3, etc.) within the test environment 308 may be configured to simulate specific scenarios or conditions to enable testing of the artifact with different parameters. In some embodiments, the virtual machine generation engine 581 can set up multiple nested virtual machines within a hosted virtual machine for testing the artifact in multiple testing layers of the test environment. Each virtual machine 591 may serve as a hosted virtual machine and each has multiple internal virtual machines 592 (also known as nested virtual machines) within each hosted virtual machine 591. In the example presented in FIG. 5C, the hosted virtual machine 591-1 further includes multiple nested virtual machines 592-1, 592-2, 592-3, and 592-4, respectively corresponding to the multiple layers of the test environment (e.g., artifacts layer 441, services layer 442, application layer 443, and application orchestration layer 444), such that the artifact testing on each layer can be performed in the corresponding nested virtual machine 592 of the hosted virtual machine 591. The hosted virtual machine 591 is configured to simulate the primary testing environment, and the nested virtual machines 592 are instantiated to simulate distinct testing layers of the test environment. The nested virtual machines 592 enable the testing of the artifact by providing isolated and controlled environments respectively for the testing layers.

The test environment template generation engine 582 is configured to generate a test environment template. The test environment template includes various environment parameters of the test environment instance. Examples of the environment parameters include but are not limited to various environment variables of the test environment such as network settings (e.g., IP addresses, subnet masks, gateways, DNS servers, and network routes), hardware specifications (computing resources), software dependencies (e.g., software libraries, frameworks, and runtime environments required by the artifact), and other relevant variables (e.g., PATH, HOME, TEMP, credentials, etc.). The test environment template may be preestablished and stored in the database.

The test environment configuration engine 583 is responsible for orchestrating the creation and configuration of a test environment instance with the virtual machine, configuring the test environment instance, and provisioning the test environment instances to allow multiple testing activities to be performed simultaneously on separate instances. The test environment configuration engine 583 can configure various environment variables of the test environment and/or specific settings of cloud-computing platform, network functions and network components, software dependencies, and other environment parameters for testing processes.

In some embodiments, the test environment configuration engine 583 may select a predetermined test environment template from the template repository. Selection of the test environment template may be guided by an assessment of the specific attributes and requirements associated with the intended testing of the artifact. In some embodiments, the test environment configuration engine 583 may assess the attributes and characteristics of the artifact and the testing objectives such as the service type, artifact type, intended functionality, performance requirements, security requirements, complexity levels, and others. The test environment configuration engine 583 may identify a test environment template that aligns with the desired testing attributes, customize the environment parameters included in the test environment template to align with the specific testing needs, and instantiate a test environment instance based on the identified test environment template and configuration.

The test environment classification engine 584 is responsible for classifying the test environment templates into different classes. As mentioned above, the to-be-tested artifacts may be classified into different classes (e.g., by the classification engine 544 of the service management platform 304 or the artifact classification engine 545 of the vendor onboarding system 305), and each artifact of a specific class carries a class identifier based on the common attributes, characteristics, and/or complexity levels of that class. Similarly, the engine 584 may also group test environment templates that exhibit similar configurations, characteristics, and intended use cases into classes. The engine 584 may establish a relationship (i.e., perform a mapping process) between artifact classes and test environment template classes. The mapping allows for alignment between the testing needs of specific artifacts and the corresponding test environment configurations. The engine 584 may select the appropriate class of test environment template from the categorized pool. The selected template class matches the characteristics and requirements of the artifact's class. Accordingly, the engine 584 can align the test environment's configuration with the artifact's class, such that the testing environment mirrors the intended real-world scenarios for production deployment of the artifact. The classification-driven selection of test environment templates could enhance efficiency by reusing templates optimized for specific use cases, and therefore avoid redundant configurations and promote efficient use of resources.

The layer configuration engine 585 is responsible for configuring multiple testing layers in a test environment instance. As described above with reference to FIG. 4, a test environment 308 may include different testing layers 440 such as artifacts layer 441, services layer 442, application layer 443, and application orchestration layer 444. Each testing layer may be separately configured during configuration of the test environment instance. For example, environment parameters for the artifacts layer 441 may include artifact storage path, artifact version control, artifact integrity rules, environment parameters for the services layer 442 may include API endpoint configuration, service dependencies, service configuration profile, environment parameters for the application layer 443 may include user interface configuration and data source configuration, environment parameters for application orchestration layer 444 may include workflow configuration, error handling configuration, and integration points configuration.

The layer orchestration engine 586 is responsible for orchestrating the various layers and arranging the various layers in an appropriate sequence during functional testing, such that the testing process is conducted in an organized and controlled manner. The layer orchestration engine 586 may define the order in which different layers are tested, determine the logical flow of interactions, and manage the flow of data and information between layers. In cases where one layer depends on the output of another layer, the layer orchestration engine 586 can arrange the layers such that the dependent layer is tested after the prerequisite layer has been tested. The layer orchestration engine 586 can manage the execution of predefined test scenarios that involve interactions between multiple layers, detect errors, exceptions, or failures that may occur during the testing process, manage parallel execution across multiple layers simultaneously, gather feedback and results from each layer's testing activities, provides insights into the overall performance behavior, identify any issues or discrepancies that need attention, and manage variations of test scenarios to simulate different usage patterns and scenarios.

In some embodiments, the functional testing system 306 may include a smoke engine 587 and a regression test engine 588 respectively configured to execute smoke tests (also referred to as build verification tests) and regression tests on the artifacts. The smoke engine 587 may retrieve the artifacts that have passed the validation process, execute a set of predefined test cases or scenarios that cover functionalities and features of the artifacts, interact with the artifacts to simulate input data and verify the expected output, capture the test results, and generate a report indicating the overall success or failure of the build verification test. Similarly, the regression test engine 588 may retrieve the previously validated artifacts, execute a set of regression test cases that cover the functionalities, features or scenarios of the artifacts, interact with the artifacts to apply different input data, configurations, or usage patterns to validate the expected output, compare the test results obtained during the regression tests with the expected results defined in the test cases, capture any discrepancies or deviations, and generate a report indicating the success or failure of the artifacts and/or the identified issues or failures.

Both smoke tests and regression tests can be performed at both the testing layer-level and the test environment-level, depending on the specific testing objectives and requirements. At the layer level, a smoke test can focus on quickly validating the basic functionality and stability of a specific layer and executing essential test cases to confirm that the core functionalities of the layer are functioning as expected. Similarly, at the layer level, a regression test can target a particular layer and validate that recent changes or updates have not negatively impacted existing functionalities. At the environment level, a smoke test is configured to verify the overall stability and readiness of the entire test environment and verify that all layers within the same test environment work cohesively together and that the environment is suitable for further testing. Similarly, environment-level regression testing is configured to assess the collective impact of changes across multiple layers within the entire test environment, with a focus on interactions between different layers that do not lead to unexpected behavior or regressions.

The database 589 is responsible for storing various data and profile received in and generated by the functional testing system 306, such as the classification rules, test environment configuration templates, artifact profiles, as well as other relevant information related to the testing process.

Figure 5D:
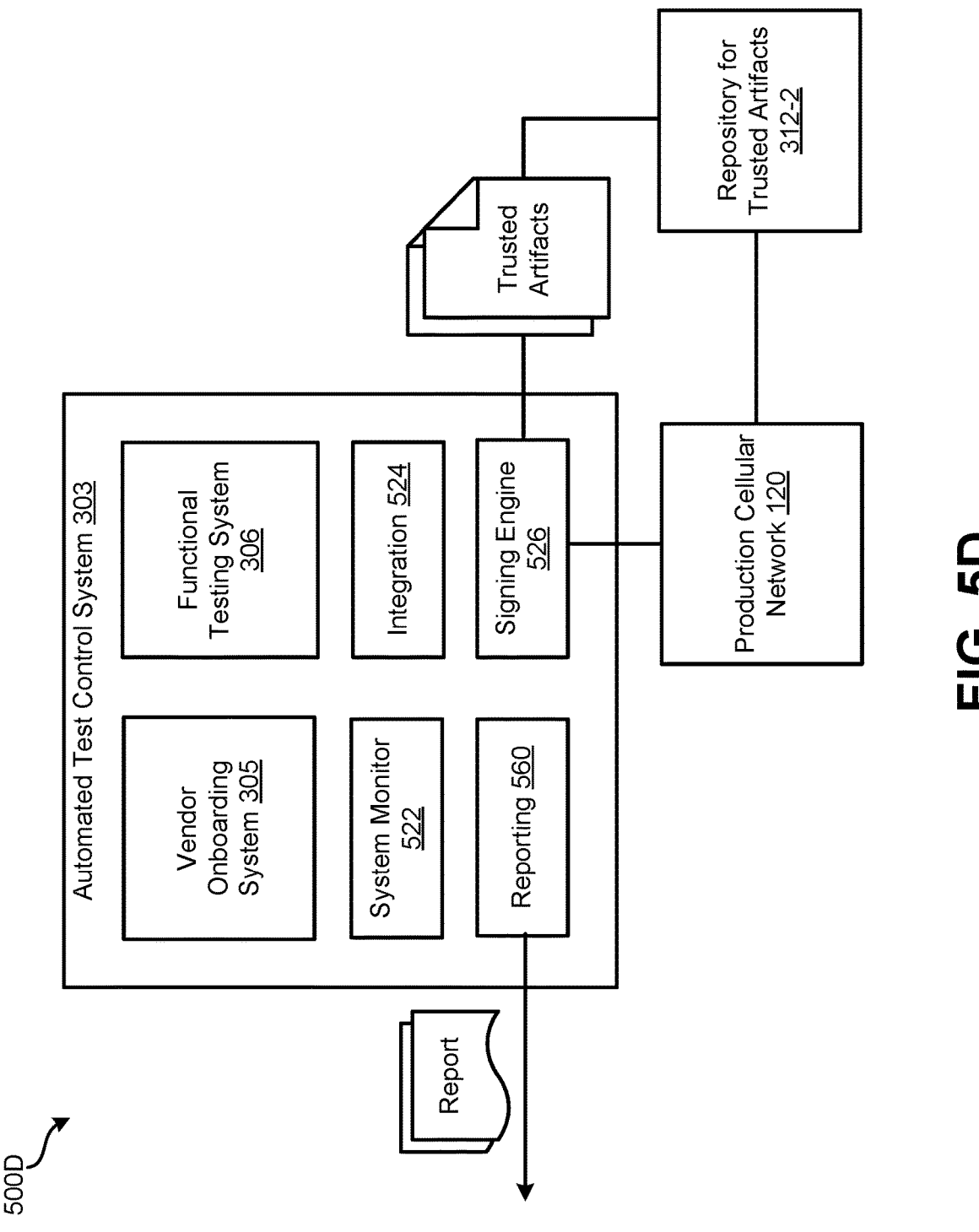
FIG. 5D is a schematic diagram illustrating another example of a communications system, according to various embodiments.

The validated and trusted artifacts that pass the artifact validation and functional tests are forwarded to other components of the automated test control system 303 (e.g., a signing engine 526 of FIG. 5D).

FIG. 5D is a schematic diagram illustrating another example of a communications system 500D (hereinafter "system 500D") according to various embodiments. In the illustrated example, the system 500D includes, among other components, the automated test control system 303, the repository for trusted artifacts 312-2, and the production cellular network 120. The automated test control system 303 includes the vendor onboarding system 305 and the functional testing system 306 as described above, and further includes a system monitor component 522, an integration component 524, a signing engine 526, and a reporting engine 560.

The system monitoring component 522 may collect and analyze various metrics, performance data, and logs related to the artifact validation and functional testing processes. The system monitoring component 522 can track the progress, status, and overall health of the testing process and generate reports, alerts, or notifications based on pre-defined thresholds or conditions. The integration component 524 is responsible for integrating and coordinating the various stages and components of the artifact validation and testing process. The integration component 524 can facilitate the flow of artifacts, data, and information between the scanner engine 516, immutability check engine 518, signing engine 526, system monitor component 522, and other relevant components within the automated test control system 303. The integration component 524 allows for smooth execution of the validation and testing procedures, coordination of the various components in the automated test control system 303, and automatic transition between stages of the validation and testing.

As mentioned above, artifact validation and testing may be executed in various test environments and on various layers within each test environment. For example, artifact validation and testing may be executed in the pre-production test environment 414 and each one of the artifacts layer 441, services layer 442, application layer 443, the application orchestration layer 444, and other layers of the pre-production test environment 414. Artifact validation and testing may also be executed in parallel or in sequence with other tests such as network function tests on the same or different layers of a specific test environment.

The signing engine 526 may sign the validated and trusted artifacts (i.e., applying digital signatures to the validated artifacts to indicate that the artifacts are trusted) to establish their authenticity and integrity. The signed artifacts, now considered trusted artifacts, are transmitted to the repository for trusted artifacts 312-2, which serves as a secure storage location for the trusted artifacts to maintain their integrity and version history. After the trusted artifacts are stored in the repository for trusted artifacts 312-2, the signing engine 526 can initiate the process of pushing the trusted artifacts to the production cellular network 120 for deployment. The artifacts may be transferred to the appropriate production environment within the network, ready for utilization by end-users or clients.

The reporting engine 560 is responsible for generating and outputting a report including the outcome of the artifact validation and functional testing for the artifact of the requested service. The report may further include issues identified during the validation and functional testing as well as recommendations for issue resolution. The report may be transmitted to the service management platform 304 or the service vendor 302.

The streamlined process with integration of test environment configuration, service artifact validation, and service testing by the automated test control system 303 provides advantages with respect to efficiency, scalability, accuracy, and reliability. The automated test control system 303 can streamline the overall testing workflow, eliminate manual steps, and reduce errors and inconsistencies. The automated test control system 303 can handle large volumes of service artifacts, diverse test scenarios and cases, and varying test environments and layers within a particular test environment.

Figure 6A:
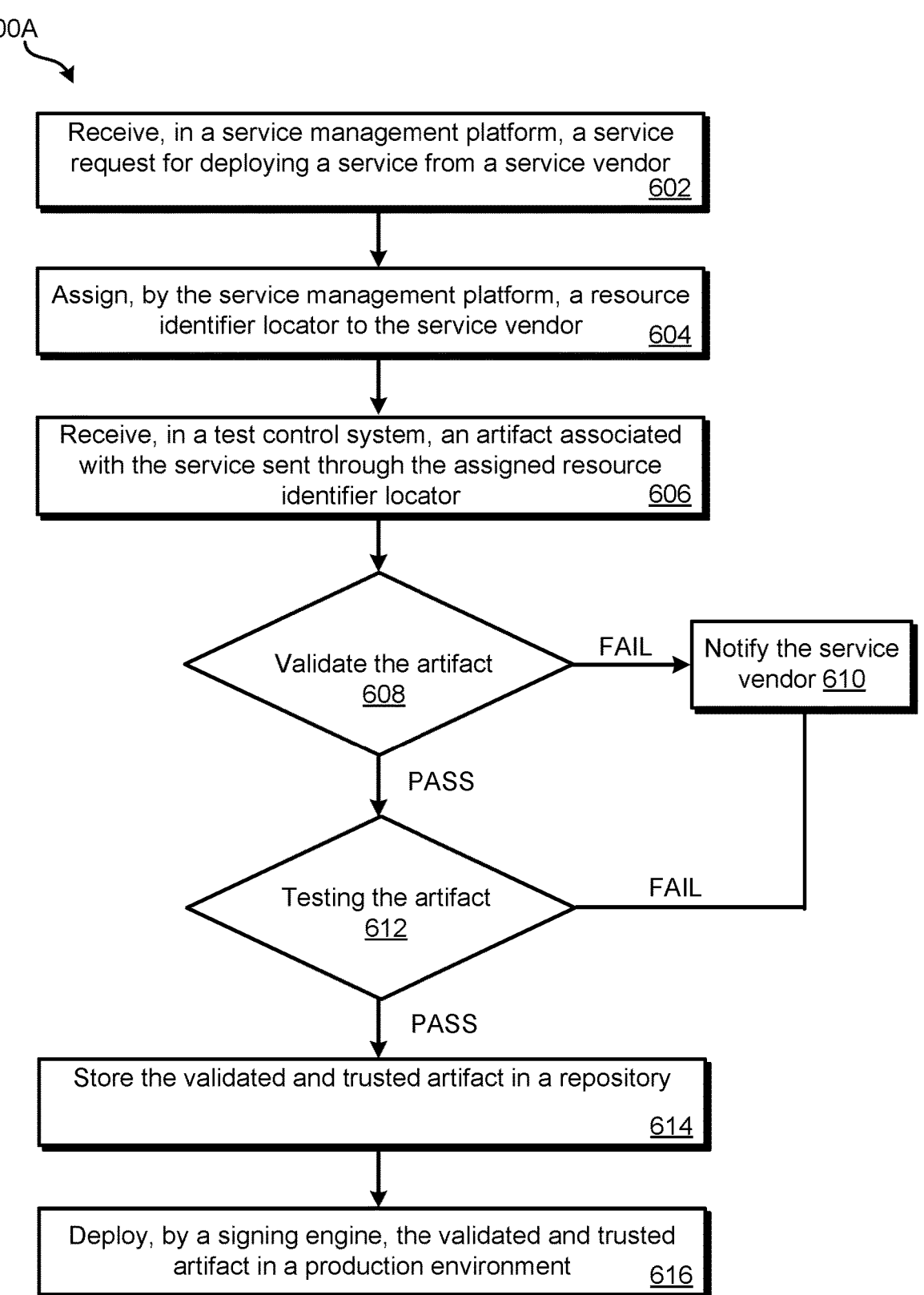
FIG. 6A is a flow diagram illustrating an example method for vendor onboarding and pre-deployment service testing, according to various embodiments.

FIG. 6A is a flow diagram illustrating an example method 600A for service vendor onboarding and pre-deployment artifact validation and functional testing, according to various embodiments. The method 600A may be implemented by one or more components included in the systems 300 or 500A-500D described herein. Depending on the implementation, the method 600A may include additional, fewer, or alternative steps performed in various orders or in parallel.

At 602, a service request for deploying a service is sent from a service vendor and received in a service management platform in connection with the service vendor and a test control system. At 604, a unique resource identifier locator is assigned to the service vendor by the service management platform. The resource identifier locator may be a URL. At 606, an artifact associated with the service is sent by the service vendor, using the assigned resource identifier locator, to the test control system and received by the test control system. The received artifact may be placed in an untrusted artifacts database prior to the validation.

At 608, the artifact is validated by an artifact validation sub-system of the test control system. At 612, if the validation is successful, one or more functional tests on the validated artifact are performed, by a functional testing device of the test control system, in a particular test environment or one or more layers within the test environment. The test environment is created and configured, by a test configuration engine of the test control system prior to testing. The one or more functional tests may include a smoke test and a regression test. If the validation fails, a notification indicating the failure of the validation is generated, at 610, and sent to the service vendor.

If the artifact passes the one or more functional tests in the test environment, the artifact is tagged with "trusted artifact" and stored, at 614, in a repository. If the artifact fails the one or more functional tests in the test environment, a notification indicating the failure of the functional testing is generated, at 610, and sent to the service vendor. At 616, the validated and trusted artifact is deployed, by a signing engine, in a production environment of a cellular network.

FIG. 6B is a flow diagram illustrating another example method 600B for pre-deployment artifact validation and functional testing, according to various embodiments. The method 600B may be implemented by one or more components included in the systems 300 or 500A-500D described herein. Depending on the implementation, the method 600B may include additional, fewer, or alternative steps performed in various orders or in parallel. The method 600B or any operations thereof may be combined with other methods described herein in any suitable manner.

At 622, a request for deploying an artifact of a service is received in the vendor onboarding system. The requested artifact may be transmitted from the service vendor through the service management platform, using a designated resource identifier locator, as described above. At 624, the artifact is registered with the vendor onboarding system, and the vendor profile, service profile, and artifact profile associated with the requested artifact may be stored in a database of the vendor onboarding system. Prior to artifact validation and functional testing, the artifact is labeled as an untrusted artifact and stored in an untrusted artifacts repository of the vendor onboarding system. In some embodiments, the artifact is inspected and analyzed by a firewall of the vendor onboarding system prior to registration.

At 626, the artifact is validated, by an artifact validation system (or sub-system) of the vendor onboarding system. In some embodiments, the artifact is scanned and analyzed to identify presence or absence of vulnerabilities, security risks, or compliance violations, according to pre-determined validation rules retrieved from a database. In some embodiments, an immutability check is performed on the artifact. In some embodiments, performing the immutability check further includes calculating a checksum or cryptographic hash of the artifact, comparing the calculated checksum or cryptographic hash with an expected checksum or cryptographic hash, and determining presence or absence of a mismatch. The absence of a mismatch indicates that the artifact passes the immutability check, and the presence of a mismatch indicates that the artifact fails the immutability check. In some embodiments, a validation output is generated to report a validation status of the artifact and indicate any errors or issues of the artifact. The report may be transmitted to the service vendor directly or indirectly (e.g., through the service management system). In some embodiments, the validated artifacts are stored in a repository for validated artifacts in connection with the vendor onboarding system.

At 628, the validated artifact is tested, by the functional testing system, to assess the functionality and performance of the artifact in a test environment. In some embodiments, operation 628 may further include, among other operations, operations 630, 632, and 634. At 630, one or more virtual machines are created by the functional testing system for establishing a test environment. The virtual machines may be created on a virtual private cloud of a cloud-computing platform. At 630, a predetermined test environment configuration template is identified and selected by the functional testing system, the predetermined test environment configuration template includes the specification, settings, and pre-configured environment parameters that match the attributes of the to-be-tested artifact. In some embodiments, a test environment is instantiated to generate one or more test environment instances, and the test environment instances are configured according to the predetermined test environment configuration templates and/or other environment variables.

At 632, one or more virtual machines are created, and one or more virtual machine instances are provisioned. When multiple virtual machines are created, each virtual machine functions as an isolated and independent computing environment for testing purposes. Each virtual machine may provide isolation from others, allowing tests to run independently and prevent interference with other virtual machines. In some embodiments, each virtual machine may correspond to a test environment. For example, a first virtual machine corresponds to a first test environment (e.g., integration test environment), a second virtual machine corresponds to a second test environment (e.g., pre-production test environment) that has a higher complexity than the first test environment, or is configured for different testing purposes. In some embodiments, one or more virtual machines can be created within the same test environment, and the virtual machines can be distributed across different physical servers or virtual private clouds for the purpose of optimizing resource allocation and/or simulating a distributed and scalable testing environment.

In other embodiments, each virtual machine can focus on testing a specific layer for a multi-layered application or system. In some embodiments, one or more nested virtual machines are created within one hosted virtual machine. The hosted virtual machine corresponds to a specific test environment, and the nested virtual machines within the hosted virtual machine respectively correspond to the multiple testing layers of the test environment, such that the artifact testing on each testing layer of the test environment can be performed in the corresponding nested virtual machine within the hosted virtual machine.

At 634, the test environment is configured. In some embodiments, the test environment instance is configured according to the identified test environment configuration template. In some embodiments, other environment variables may also be configured. In some embodiments, one or more nested virtual machines are configured within the hosted virtual machine to establish multiple layers of the test environment.

At 636, the artifact is tested in the test environment. In some embodiments, operation 636 further includes operations 638 and 640. At 638, the artifact is deployed on the virtual machine within the test environment. At 640, execution of tests on the artifact is initiated within each one of the hosted virtual machines. In some embodiments, the tests may be executed in each nested virtual machine within the hosted virtual machine sequentially. In other embodiments, the tests may be executed in each nested virtual machine within the hosted virtual machine simultaneously. Data and results of the tests executed within the virtual machines may be captured and collected, and the issues or failures may be identified.

At 642, results of artifact validation and testing are obtained and output. In some embodiments, a report including the status of the functional testing (i.e., PASS or FAIL) is generated, and any identified issues may also be included in the report.

FIG. 6C is a flow diagram illustrating another example method 600C for pre-deployment artifact validation and functional testing, according to various embodiments. The method 600C may be implemented by one or more components included in the systems 300 or 500A-500D described herein. Depending on the implementation, the method 600C may include additional, fewer, or alternative steps performed in various orders or in parallel. The method 600C or any operations thereof may be combined with other methods described herein in any suitable manner.

At 652, a request for testing a to-be-deployed artifact is received in the automated test control system. At 654, the artifact is analyzed, by the artifact analytics device, to extract an artifact profile, a configuration profile, and a release note associated with the artifact. The artifact profile may include one or more attributes of the artifact extracted from the artifact.

At 656, a class identifier is assigned to the artifact according to a predetermined classification rule. The classification rule may be used to classify the artifacts into multiple classes, and each class of artifacts may have one or more common attributes such as vendor type, service type, application type, artifact type, artifact complexity level/score. The attributes extracted from the artifact may be compared against the attributes of each class, and the class identifier that best aligns with the artifact's attributes may be identified and assigned to the artifact.

At 658, a predetermined test environment configuration template that corresponds to the ascribed class identifier of the artifact is identified and retrieved from an inventory including an array of pre-established test environment configuration templates. The identified test environment configuration template is predetermined and includes a series of predefined environment parameters aligned with the class identifier attributed to the artifact.

At 660, an instance of a test environment is created and configured in conformity with the test environment configuration template that was determined based on the assigned class identifier of the artifact. In some embodiments, an instance of a test environment can be created for a previously tested artifact according to the artifact profile and the class identified assigned to the artifact, obviating the necessity for reconfiguring the test environment and enhancing the overall efficiency of the testing process. At 662, a functional testing is executed on the artifact within the test environment instance.

Figure 7:
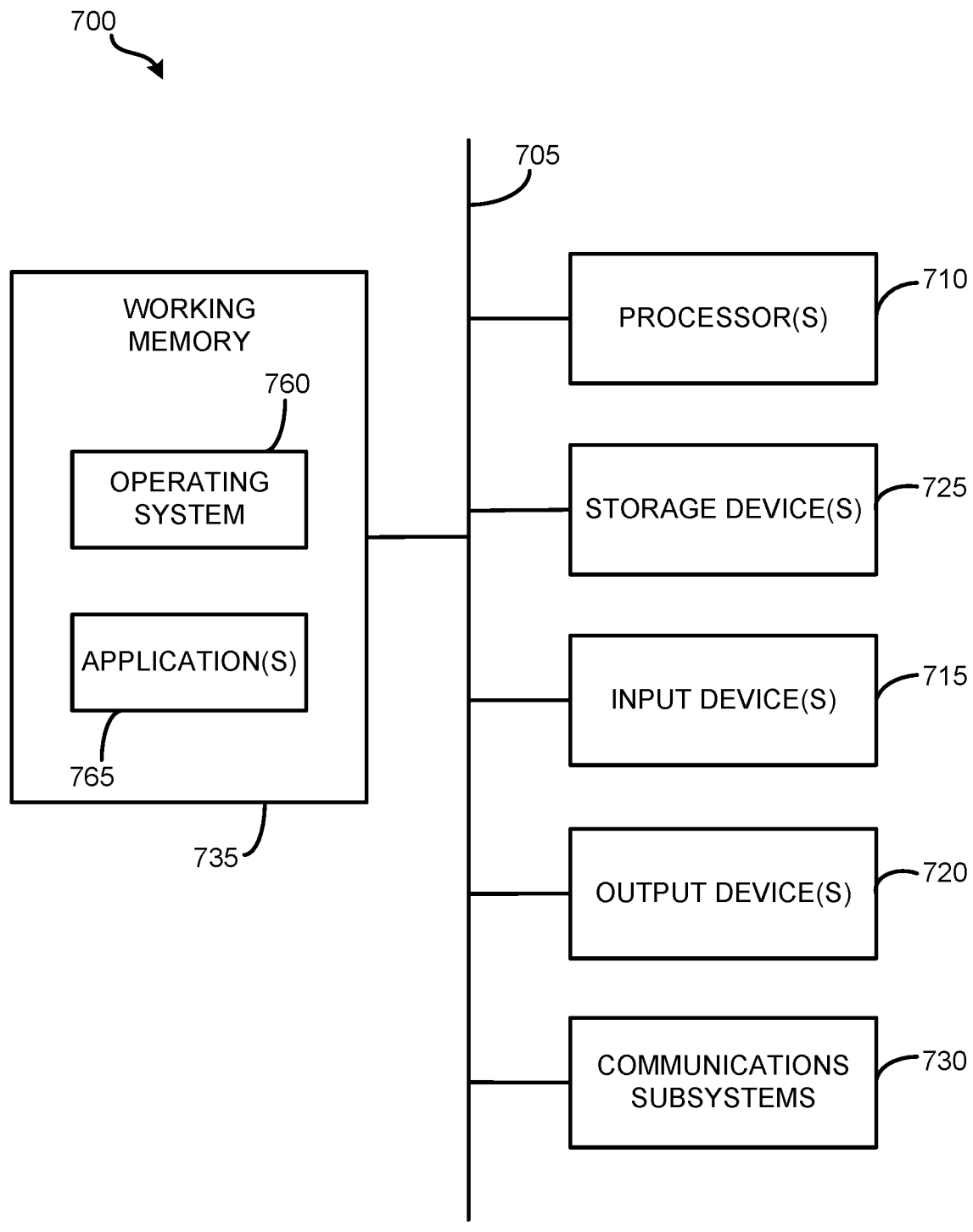
FIG. 7 is a schematic diagram illustrating an example computer system or computer device, according to various embodiments.

The automated test control system and other components in the system 300 or 500A-500D described above may include a computer system that further includes computer hardware and software that form special-purpose network circuitry to implement various embodiments such as communication, calculation, artifact validation, functional testing, test environment configuration, and so on. FIG. 7 is a schematic diagram illustrating an example of computer system 700. The computer system 700 is a simplified computer system that can be used to implement various embodiments described and illustrated herein. A computer system 700 as illustrated in FIG. 7 may be incorporated into devices such as a portable electronic device, mobile phone, server grade machines, or other device as described herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, solid state drive, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "an artifact" includes a plurality of such arti-facts, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method, comprising:
   receiving, in an automated test control system in connection with a cellular network implemented on a cloud-computing platform, an artifact associated with a service provided by a service vendor, wherein the service is to be deployed on the cellular network;
   storing the received artifact in an untrusted artifacts database;
   generating and configuring a first test environment on a first virtual private cloud of the cloud-computing platform;
   automatically performing validation on the received artifact in the first test environment;
   in response to a determination that the artifact is validated, performing functional testing on the validated artifact in the first test environment; and
   in response to a determination that the artifact passes the functional testing, signing the artifact and storing the signed artifact in a repository.

2. The method of claim 1, further comprising:
   receiving, in a service management platform, a service request for deploying the service from the service vendor; and
   assigning, by the service management platform, a resource identifier locator to the service vendor,
   wherein the artifact is transmitted to the automated test control system using the assigned resource identifier locator.

3. The method of claim 1, wherein the first test environment further comprises an artifacts testing layer, a services testing layer, an applications testing layer, and an application orchestration testing layer, and the functional testing of the artifact is performed on the artifacts testing layer.

4. The method of claim 1, wherein performing the validation further comprises:
   performing an immutability check on the artifact to identify presence or absence of vulnerabilities, security risks, or compliance violations, according to pre-determined validation rules retrieved from a database.

5. The method of claim 4, wherein performing the immutability check further comprises:
   calculating a checksum or cryptographic hash of the artifact;
   comparing the calculated checksum or cryptographic hash with an expected checksum or cryptographic hash; and
   determining presence or absence of a mismatch, wherein the absence of a mismatch indicates that the artifact passes the immutability check, and the presence of a mismatch indicates that the artifact fails the immutability check.

6. The method of claim 1, wherein performing the functional testing further comprises:

performing a smoke test and a regression test on the validated artifact; and generating a report indicating a status the validated artifact, the status indicating whether the validated artifact passes or fails the smoke test and the regression test.

7. The method of claim 1, further comprising:

in response to a determination that the artifact is not validated, generating a first notification indicating that the artifact is not validated; and transmitting the first notification to the service vendor.

8. The method of claim 1, further comprising:

in response to a determination that the artifact fails the functional testing, generating a second notification indicating that the artifact fails the functional testing; and transmitting the second notification to the service vendor.

9. The method of claim 1, further comprising:

generating and configuring a second test environment on a second virtual private cloud of the cloud-computing platform, the second test environment being having a higher complexity level than the first test environment; and performing functional testing on the validated artifact in the second test environment.

10. The method of claim 1, further comprising:

deploying the validated artifact stored in the repository in a production environment of the cellular network.

11. An automated test control system in connection with a cellular network implemented on a cloud-computing platform, the automated test control system comprising:

one or more processors; and a computer-readable storage media storing computer-executable instructions that, when executed by the one or more processors, cause the system to:

receive an artifact associated with a service provided by a service vendor, wherein the service is to be deployed on the cellular network;

store the received artifact in an untrusted artifacts database;

generate and configure a first test environment on a first virtual private cloud of the cloud-computing platform;

automatically perform validation on the received artifact in the first test environment;

in response to a determination that the artifact is validated, perform functional testing on the validated artifact in the first test environment; and in response to a determination that the artifact passes the functional testing, sign the artifact and store the signed artifact in a repository.

12. The automated test control system of claim 11, wherein the instructions when executed by the one or more processors further cause the automated test control system to:

receive a service request for deploying the service from the service vendor; and assign a resource identifier locator to the service vendor, wherein the artifact is transmitted to the automated test control system using the assigned resource identifier locator.

13. The automated test control system of claim 11, wherein the first test environment further comprises an artifacts testing layer, a services testing layer, an applications testing layer, and an application orchestration testing layer, and the functional testing of the artifact is performed on the artifacts testing layer.

14. The automated test control system of claim 11, wherein the instructions when executed by the one or more processors further cause the automated test control system to:

perform an immutability check on the artifact to identify presence or absence of vulnerabilities, security risks, or compliance violations, according to pre-determined validation rules retrieved from a database.

15. The automated test control system of claim 14, wherein the instructions when executed by the one or more processors further cause the automated test control system to:

calculate a checksum or cryptographic hash of the artifact;

compare the calculated checksum or cryptographic hash with an expected checksum or cryptographic hash; and determine presence or absence of a mismatch, wherein the absence of a mismatch indicates that the artifact passes the immutability check, and the presence of a mismatch indicates that the artifact fails the immutability check.

16. The automated test control system of claim 11, wherein the instructions when executed by the one or more processors further cause the automated test control system to:

perform a smoke test and a regression test on the validated artifact; and generate a report indicating a status the validated artifact, the status indicating whether the validated artifact passes or fails the smoke test and the regression test.

17. The automated test control system of claim 11, wherein the instructions when executed by the one or more processors further cause the automated test control system to:

in response to a determination that the artifact is not validated, generate a first notification indicating that the artifact is not validated; and transmit the first notification to the service vendor.

18. The automated test control system of claim 11, wherein the instructions when executed by the one or more processors further cause the automated test control system to:

in response to a determination that the artifact fails the functional testing, generate a second notification indicating that the artifact fails the functional testing; and transmit the second notification to the service vendor.

19. The automated test control system of claim 11, wherein the instructions when executed by the one or more processors further cause the automated test control system to:

generate and configure a second test environment on a second virtual private cloud of the cloud-computing platform, the second test environment having a higher complexity level than the first test environment; and perform functional testing on the validated artifact in the second test environment.

20. The automated test control system of claim 11, wherein the instructions when executed by the one or more processors further cause the automated test control system to:

deploying the validated artifact stored in the repository in a production environment of the cellular network.

* * * * *